(12) United States Patent
Miyata

(10) Patent No.: US 11,475,852 B1
(45) Date of Patent: Oct. 18, 2022

(54) LIGHT-EMITTING DEVICE, DISPLAY DEVICE, AND LED DISPLAY DEVICE

(71) Applicant: Sharp Display Technology Corporation, Kameyama (JP)

(72) Inventor: Hidekazu Miyata, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/684,781

(22) Filed: Mar. 2, 2022

(30) Foreign Application Priority Data

Apr. 14, 2021 (JP) .............................. JP2021-068101

(51) Int. Cl.
*G09G 3/3291* (2016.01)
*G09G 3/00* (2006.01)

(52) U.S. Cl.
CPC ............ *G09G 3/3291* (2013.01); *G09G 3/006* (2013.01); *G09G 2330/12* (2013.01)

(58) Field of Classification Search
CPC ....... G09G 2300/0426; G09G 2300/08; G09G 2300/0819; G09G 2330/12; G09G 2330/028; G09G 2310/0232; G09G 2310/0291; G09G 3/006; G09G 3/3233; G09G 3/3208; G09G 2320/0223; G09G 2320/029; G09G 2320/0233; G09G 2320/043
See application file for complete search history.

(56) References Cited

U.S. PATENT DOCUMENTS

| | | | | |
|---|---|---|---|---|
| 2008/0150934 | A1* | 6/2008 | Ozaki | G09G 3/22 345/214 |
| 2010/0171774 | A1 | 7/2010 | Mizukoshi et al. | |
| 2011/0109611 | A1 | 5/2011 | Nakamura | |
| 2011/0242087 | A1* | 10/2011 | Ebisuno | G09G 3/3233 345/212 |
| 2015/0279324 | A1* | 10/2015 | Ohta | G09G 3/3283 345/82 |
| 2018/0061341 | A1* | 3/2018 | Kang | G09G 3/3648 |
| 2019/0235336 | A1* | 8/2019 | Uehata | G02F 1/1368 |

FOREIGN PATENT DOCUMENTS

| | | |
|---|---|---|
| JP | 2003-280590 A | 10/2003 |
| JP | 2009-031451 A | 2/2009 |
| JP | 2012-226360 A | 11/2012 |

* cited by examiner

*Primary Examiner* — Dong Hui Liang
(74) *Attorney, Agent, or Firm* — ScienBiziP, P.C.

(57) ABSTRACT

A light-emitting device is provided with a drive voltage adjustment circuit configured to adjust a voltage value of a drive voltage for driving a plurality of LEDs, and a feedback wiring line for supplying the drive voltage adjustment circuit with a voltage of a voltage detection target node while taking, as the voltage detection target node, a position before a position where a drive voltage wiring line branches on the LED substrate. In accordance with a difference between a voltage supplied from a drive voltage generation circuit and a voltage supplied from the feedback wiring line, the drive voltage adjustment circuit outputs, as the drive voltage, a voltage higher than the voltage supplied from the drive voltage generation circuit.

14 Claims, 31 Drawing Sheets

LIGHT-EMITTING DEVICE, DISPLAY DEVICE, AND LED DISPLAY DEVICE

CROSS-REFERENCE TO RELATED APPLICATIONS

This application claims the benefit of priority to Japanese Patent Application Number 2021-068101 filed on Apr. 14, 2021. The entire contents of the above-identified application are hereby incorporated by reference.

BACKGROUND

Technical Field

The following disclosure relates to a light-emitting device having an LED as a light source, a display device using the light-emitting device as a backlight, and an LED display device including the light-emitting device.

In recent years, a light emitting diode (LED) (including an organic light-emitting diode (OLED)) has frequently been used as a constituent element of a display device. For example, in liquid crystal display devices, the employment of a backlight using LEDs as a light source has been increasing in terms of low power consumption, easiness of luminance control, and the like. In addition, an organic EL display device using an OLED as a display element is well on the way to being widely available in terms of easiness of thinning and the like.

In order for a backlight of a liquid crystal display device to achieve lower power consumption, a technique known as "local dimming" has been developed in which the luminance (lighting luminance) of LEDs is controlled for each of areas. In a direct backlight where the local dimming is performed, an LED substrate is logically divided into a plurality of areas, and each area is provided with an LED unit including one or a plurality of LEDs to serve as a light source. The plurality of LEDs constituting the backlight are individually driven, but the anode of each of the plurality of LEDs is supplied with a drive voltage from the same power supply. In the following, a circuit that functions as a power supply for generating a drive voltage for driving an LED is referred to as a "drive voltage generation circuit", and a wiring line for supplying the drive voltage to a plurality of LEDs from the drive voltage generation circuit is referred to as a "drive voltage wiring line". As for the drive voltage, a voltage drop (IR drop) due to wiring line resistance of the drive voltage wiring line is generated. The magnitude of the above voltage drop depends on the length of the drive voltage wiring line from the drive voltage generation circuit to the anode of each LED. For example, the effect of the voltage drop is small for the LEDs provided at a position near the drive voltage generation circuit, but the effect of the voltage drop is large for the LEDs provided at a position far from the drive voltage generation circuit. As described above, a variation in luminance is generated among the LEDs. In other words, luminance unevenness occurs. Likewise, also in the organic EL display device, a difference in magnitude of the voltage drop of the drive voltage is generated among pixels, whereby luminance unevenness occurs.

A configuration in which drive voltage wiring lines are provided in a matrix shape is disclosed in JP 2012-226360 A, for example. According to this configuration, the magnitude of the voltage drop of the drive voltage is made uniform for a plurality of LEDs, so that the occurrence of luminance unevenness is suppressed. In JP 2009-31451 A, it is described that luminance unevenness is reduced by compensating image data based on a panel current, which is a sum of the currents supplied to the respective pixels. In JP 2003-280590 A, it is described that the occurrence of luminance reduction and luminance unevenness is prevented by compensating an input image signal based on a voltage drop calculated from the average luminance of the input image signals.

SUMMARY

According to the technique disclosed in JP 2012-226360 A, the magnitude of the voltage drop of the drive voltage is made uniform for the plurality of LEDs. However, with regard to the drive voltage wiring lines, in a wiring line portion extending from a drive voltage generation circuit to a branch point (a branch point closest to the drive voltage generation circuit) located on an LED substrate mounting the plurality of LEDs thereon, a current of magnitude equivalent to the sum of the currents to be supplied to the plurality of LEDs is produced. Because of this, the amount of current in the wiring line portion is noticeably large. In addition, the amount of current varies considerably depending on the number of LEDs being turned on and the lighting luminance of each LED. That is, the degree of the voltage drop due to the wiring line resistance of the wiring line portion changes considerably depending on the number of LEDs being turned on and the lighting luminance of each LED. As a result, even when it is attempted to turn on a certain LED at constant luminance, the lighting luminance of the LED changes considerably depending on a total number of LEDs being turned on and the lighting luminance of other LEDs.

As described above, in a backlight where local dimming is performed, even when it is attempted to turn on an LED of a certain area at constant luminance, the lighting luminance of the LED differs between a case in which only the LED of one area is turned on and a case in which the LEDs of a large number of areas are turned on. Likewise, in an LED display device such as an organic EL display device, even when it is attempted to cause a certain pixel to perform display at constant luminance, the luminance of the pixel differs between a case in which only an LED of the above pixel is turned on and a case in which LEDs of a large number of pixels are turned on.

In the display device disclosed in JP 2009-31451 A, image data is compensated based on the panel current (the sum of the currents supplied to the respective pixels). As for this technique, the display of a still image is not particularly problematic, but image data is not appropriately compensated when a moving picture is displayed. The reason for this is as follows. In this display device, the voltage drop of a voltage PVdd is generated due to wiring line resistance of a power supply line for supplying the voltage PVdd to the anode of the LED constituting each pixel. The image data is compensated in order to prevent luminance reduction in each pixel caused by the voltage drop. When one pixel is paid attention to, the magnitude of a holding voltage at the pixel is constant throughout a period from when the writing based on the image data after the compensation is performed until when the subsequent writing is performed. On the other hand, the panel current changes each time when the writing to each of the pixels in the panel is performed. Accordingly, the degree of the voltage drop of the voltage PVdd changes during the period when the holding voltage is maintained at constant magnitude in each pixel. This causes the luminance of each pixel to change. A method of calculating the panel current from input image data is also described in JP 2009-31451 A, but image data of one frame is required in order to calculate the panel current, which may significantly increase the circuit scale.

In view of the above-described circumstances, an object of the following disclosure is to implement a light-emitting device capable of suppressing a change in lighting luminance caused by a voltage drop of a drive voltage of LEDs.

(1) A light-emitting device according to some embodiments of the disclosure is a light-emitting device in which a light emitting diode (LED) serves as a light source, the light-emitting device includes:

an LED substrate on which a plurality of LEDs are mounted;

a drive voltage generation circuit configured to generate a drive voltage for driving the plurality of LEDs;

a drive voltage adjustment circuit configured to adjust a voltage value of the drive voltage;

a drive voltage wiring line including a first wiring line disposed between the drive voltage generation circuit and the drive voltage adjustment circuit, a second wiring line disposed between the drive voltage adjustment circuit and the LED substrate, and a third wiring line disposed on the LED substrate, the drive voltage wiring line being configured to supply the drive voltage to the plurality of LEDs; and a feedback wiring line for supplying the drive voltage adjustment circuit with a voltage of a voltage detection target node provided on the third wiring line, wherein the third wiring line, which has a drive voltage input node being a connection point with the second wiring line as a start point, branches at one or more branch points on the LED substrate, the feedback wiring line is disposed between the voltage detection target node and the drive voltage adjustment circuit, where a main branch node which is a branch point closest to the drive voltage input node among the one or more branch points is taken as the voltage detection target node, or one point between the drive voltage input node and the main branch node is taken as the voltage detection target node, and the drive voltage adjustment circuit outputs a voltage higher than a voltage supplied by the first wiring line to the second wiring line as the drive voltage in accordance with a difference between the voltage supplied by the first wiring line and a voltage supplied by the feedback wiring line.

(2) The light-emitting device according to some embodiments of the disclosure includes the configuration of (1) described above, wherein the drive voltage adjustment circuit includes a drive voltage output control circuit configured to stop the output of the drive voltage to the second wiring line in a case where the voltage of the voltage detection target node is not successfully transmitted by the feedback wiring line.

(3) The light-emitting device according to some embodiments of the disclosure includes the configuration of (2) described above, wherein the drive voltage adjustment circuit further includes an adjusted voltage output circuit configured to generate an adjusted voltage that is output as the drive voltage to the second wiring line based on the voltage supplied by the first wiring line and the voltage supplied by the feedback wiring line, and output the adjusted voltage to the second wiring line as the drive voltage, the drive voltage output control circuit includes, a feedback voltage judgment circuit configured to judge whether the voltage of the voltage detection target node is successfully transmitted by the feedback wiring line by comparing the voltage supplied by the feedback wiring line with a predetermined set voltage, and a drive voltage output control switch provided between the adjusted voltage output circuit and the second wiring line, and in a case where the feedback wiring line judges that the voltage of the voltage detection target node is not successfully transmitted, the feedback voltage judgment circuit supplies a control signal to the drive voltage output control switch in such a manner as to cause the drive voltage output control switch to be in an off state.

(4) The light-emitting device according to some embodiments of the disclosure includes the configuration of (3) described above, wherein the drive voltage adjustment circuit further includes an additional voltage output circuit configured to output, during regular operation, an additional voltage corresponding to a sum of a maximum dropped voltage of the drive voltage expected to be generated in a route from the adjusted voltage output circuit to the voltage detection target node and the drive voltage to be supplied to the plurality of LEDs, and in a case where the voltage supplied by the feedback wiring line is equal to or lower than the set voltage and the additional voltage is equal to or higher than a drive voltage to be supplied to the plurality of LEDs, the feedback voltage judgment circuit supplies the above-described control signal to the drive voltage output control switch in such a manner as to cause the drive voltage output control switch to be in the off state.

(5) The light-emitting device according to some embodiments of the disclosure includes the configuration of (4) described above, wherein the adjusted voltage output circuit includes an operational amplifier having an inverting input terminal connected to the feedback wiring line, a non-inverting input terminal connected to the first wiring line, and an output terminal connected to the second wiring line.

(6) The light-emitting device according to some embodiments of the disclosure includes the configuration of (5) described above, wherein the above-described additional voltage is supplied as a positive side power supply voltage to the operational amplifier.

(7) The light-emitting device according to some embodiments of the disclosure includes any one of the configurations (3) to (6) described above, wherein the feedback voltage judgment circuit includes a resistor with one end connected to the feedback wiring line and the other end grounded, and a resistance value of the resistor is not less than 1000 times a value of wiring line resistance of the feedback wiring line.

(8) The light-emitting device according to some embodiments of the disclosure includes the configuration of (1) described above, wherein the drive voltage adjustment circuit includes an operational amplifier having an inverting input terminal connected to the feedback wiring line, a non-inverting input terminal connected to the first wiring line, and an output terminal connected to the second wiring line.

(9) An LED display device according to some embodiments of the disclosure includes, the light-emitting device of any one of the configurations (1) to (8) described above, and a luminance control circuit configured to control luminance of the plurality of LEDs.

(10) The LED display device according to some embodiments of the disclosure includes the configuration of (9) described above, wherein the plurality of LEDs are organic light-emitting diodes.

(11) A display device according to some embodiments of the disclosure includes, a display panel having a display portion configured to display an image; and the light-emitting device of any one of the configurations of (1) to (8) described above that is provided on a back face of the display panel in such a manner that the display portion is irradiated with light.

(12) The display device according to some embodiments of the disclosure includes the configuration of (11) described above, wherein the light-emitting device includes, a plurality of LED units, each being constituted of one or more LEDs, provided on the LED substrate being logically divided into a plurality of areas, corresponding to the plurality of areas one-to-one, a plurality of area drive circuits provided corresponding to the plurality of LED units one-to-one, each being configured to drive the LED included in a corresponding LED unit, a plurality of write control lines, a plurality of data lines intersecting with the plurality of write control lines, a ground wiring line, and a drive control circuit connected to the plurality of write control lines and the plurality of data lines, and configured to control action of the plurality of area drive circuits in such a manner that the LEDs included in the plurality of LED units are driven row by row, and each area drive circuit includes, a drive transistor connected in series to the LED included in a corresponding one of the LED units between the third wiring line and the ground wiring line, a writing control transistor having a control terminal connected to a corresponding one of the write control lines and a first conduction terminal connected to the corresponding data line, and a holding capacitor having one end connected to a second conduction terminal of the writing control transistor and a control terminal of the drive transistor and another end connected to the ground wiring line.

(13) The display device according to some embodiments of the disclosure includes the configuration of (11) or (12) described above, wherein the drive voltage is supplied from the drive voltage generation circuit to the LED substrate via a plurality of drive voltage supply paths as the drive voltage wiring line, and the drive voltage adjustment circuit and the feedback wiring line are provided corresponding to each of the plurality of drive voltage supply paths.

(14) The display device according to some embodiments of the disclosure includes the configuration of (11) described above, wherein the light-emitting device includes, a plurality of LED units, each being constituted of one or more LEDs, that are divided into a plurality of blocks, a switching circuit configured to switch a supply destination of a drive voltage generated by the drive voltage generation circuit among the plurality of blocks in such a manner that the LEDs included in the plurality of LED units are driven for each block, and a light source control circuit including lighting control switches of a number equal to the number of LED units included in each block, each lighting control switch being configured to control whether to supply a current to the LED constituting the corresponding LED unit, and the third wiring line, the drive voltage adjustment circuit, and the feedback wiring line are provided correspond to each of the plurality of blocks.

According to the light-emitting device according to some embodiments of the disclosure, there are provided a drive voltage adjustment circuit configured to adjust a voltage value of a drive voltage for driving a plurality of LEDs mounted on an LED substrate, and a feedback wiring line for supplying the drive voltage adjustment circuit with a voltage of a voltage detection target node while taking, as the voltage detection target node, a position before a position where a drive voltage wiring line branches on the LED substrate. In accordance with a difference between a voltage supplied from a drive voltage generation circuit and a voltage supplied from the feedback wiring line, the drive voltage adjustment circuit outputs, as the drive voltage, a voltage higher than the voltage supplied from the drive voltage generation circuit. As a result, regardless of the magnitude of a drive current in the entire LED substrate, a state is maintained in which the voltage of the voltage detection target node on the LED substrate is substantially equal to the drive voltage output from the drive voltage generation circuit. Because of this, when it is attempted to turn on a certain LED at constant luminance, a situation in which the lighting luminance of the LED changes considerably depending on a total number of LEDs to be turned on and the lighting luminance of other LEDs is prevented. As described above, the light-emitting device capable of suppressing a change in lighting luminance caused by a voltage drop of the drive voltage of the LED is implemented.

BRIEF DESCRIPTION OF DRAWINGS

The disclosure will be described with reference to the accompanying drawings, wherein like numbers reference like elements.

FIG. 6 is a diagram describing that luminance of a pixel differs between a case in which only an LED of one pixel is turned on and a case in which LEDs of a large number of pixels are turned on.

DESCRIPTION OF EMBODIMENTS

0. Introduction 0.1 Voltage Drop of Drive Voltage

Prior to describing embodiments, an LED display device is cited as an example, and an effect of the voltage drop of a drive voltage for driving LEDs is described.

Figure 2:
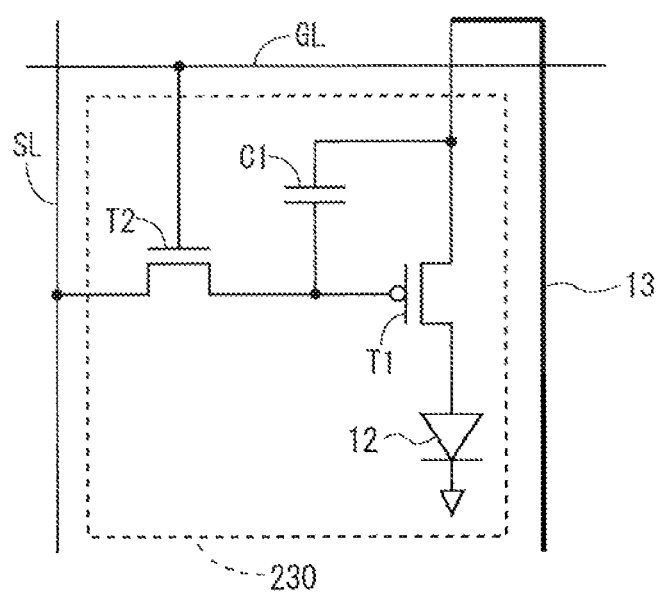
FIG. 2 is a circuit diagram illustrating a configuration of a pixel unit of a light emitting diode (LED) display device.

First, the drive action of a pixel in an LED display device will be described with reference to FIG. 2. A pixel unit 230 of the LED display device includes, for example, a drive transistor T1, a writing control transistor T2, a voltage holding capacitor C1, and an LED 12, as illustrated in FIG. 2. The drive voltage is supplied to the pixel unit 230 by a drive voltage wiring line 13. The pixel unit 230 is connected to one gate bus line GL and one source bus line SL. When a scanning signal applied to the gate bus line GL rises to a high level, the writing control transistor T2 is turned to be in an on state, and writing to the voltage holding capacitor C1 is performed based on a data voltage applied to the source bus line SL. The magnitude of a current flowing between the source and drain of the drive transistor T1 is determined based on the voltage having been written to the voltage holding capacitor C1.

Figure 3:
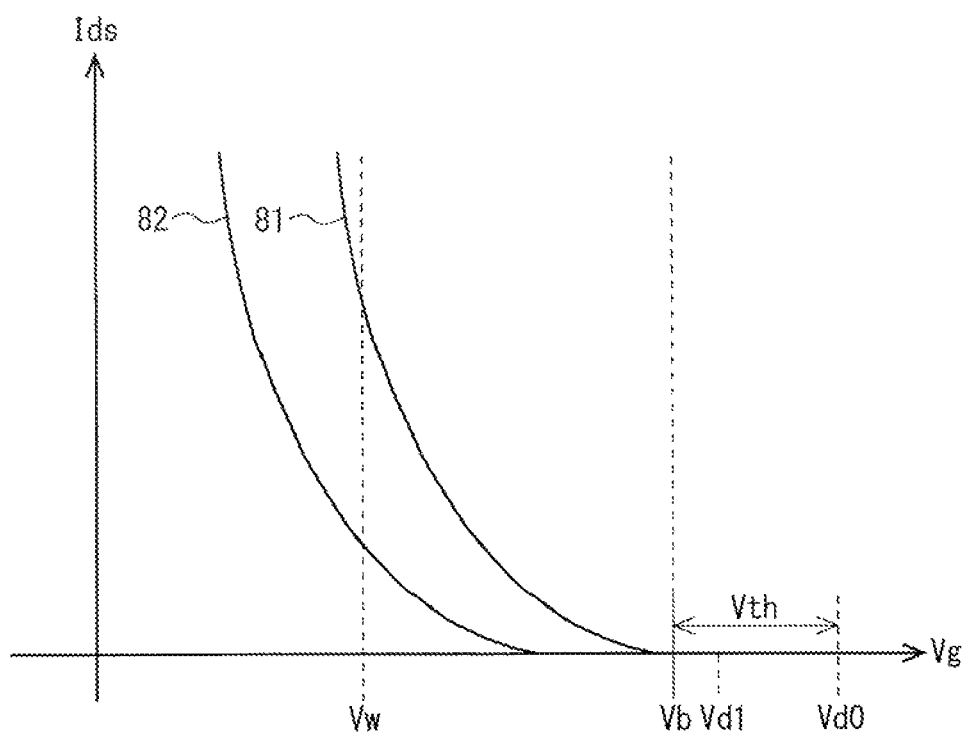
FIG. 3 is a diagram showing a relationship between a gate voltage of a drive transistor and a current flowing between a source and a drain of the drive transistor.

In a case where the drive transistor T1 is a p-channel type transistor as illustrated in FIG. 2, a relationship between a gate voltage Vg of the drive transistor T1 and a current Ids flowing between the source and drain of the drive transistor T1 is represented as a curved line denoted by a reference sign 81 in FIG. 3. In FIG. 3, Vd0 represents a drive voltage supplied to the pixel unit 230 by the drive voltage wiring line 13, Vth represents a threshold voltage of the drive transistor T1, Vb represents a black voltage (voltage corresponding to black display), and Vw represents a white voltage (voltage corresponding to white display).

A source driver outputs the black voltage Vb after D/A conversion to the source bus line SL when a data value of input data corresponds to the 0 gray scale, and outputs the white voltage Vw after D/A conversion to the source bus line SL when the data value of the input data corresponds to the maximum gray scale. In a case where the data value of the input data corresponds to a gray scale between the 0 gray scale and the maximum gray scale, a voltage (a voltage between the black voltage Vb and the white voltage Vw) obtained by performing D/A conversion in such a manner that the luminance maintains y characteristics between the 0 gray scale and the maximum gray scale is output to the source bus line SL. As described above, the voltage output to the source bus line SL is written to the voltage holding capacitor C1 within the pixel unit 230 corresponding to the gate bus line GL in a selection state. The voltage written to the voltage holding capacitor C1 is used as the gate voltage of the drive transistor T1. The current Ids corresponding to a voltage between the gate and source of the drive transistor T1 flows between the source and drain of the drive transistor T1. However, when a voltage drop of the drive voltage supplied to the pixel unit 230 is generated, desired magnitude of the current Ids does not flow.

Examples of adverse effects caused by the voltage drop of the drive voltage in the LED display device include an adverse effect caused by the voltage drop of the drive voltage at the writing time of pixel data and an adverse effect caused by the voltage drop of the drive voltage at the non-writing time of pixel data.

First, the adverse effect caused by the voltage drop of the drive voltage at the writing time of the pixel data will be described. The voltage drop of the drive voltage is generated because there is a resistive component in the drive voltage wiring line 13. Accordingly, when a current flows through the drive voltage wiring line 13, the voltage supplied to the pixel unit 230 by the drive voltage wiring line 13 becomes lower than the desired voltage input to the panel. In a case where the drive voltage supplied by the drive voltage wiring line 13 illustrated in FIG. 2 is changed by the voltage drop from Vd0 to Vd1 at the time of writing the pixel data (see FIG. 3), even when a desired voltage is written to the voltage holding capacitor C1 and a state in which the desired voltage is written in the voltage holding capacitor C1 is maintained, the source voltage of the drive transistor T1 is lower than the original voltage, whereby the relationship between the gate voltage Vg of the drive transistor T1 and the current Ids flowing between the source and drain of the drive transistor T1 is visually represented by a curved line denoted by a reference sign 82 in FIG. 3. Because of this, the LED 12 does not emit light at the desired luminance.

When the writing control transistor T2 changes from the on state to the off state after a certain voltage is written to the voltage holding capacitor C1, because the gate and the source of the drive transistor T1 are coupled with the voltage holding capacitor C1, the voltage between the gate and source is maintained. Thus, during the period when the writing control transistor T2 is maintained in the off state, the current Ids flowing between the source and drain of the drive transistor T1 is maintained at constant magnitude. Accordingly, by compensating image data at the writing time, as in a technique disclosed in JP 2009-31451 A, a desired current may flow between the source and drain of the drive transistor T1. However, when the voltage drop of the drive voltage is generated at the non-writing time of pixel data, the current flowing through the LED 12 changes due to the characteristics of the LED 12, and therefore the LED 12 does not emit light at the desired luminance.

Next, the adverse effect caused by the voltage drop of the drive voltage at the non-writing time of the pixel data will be described. For example, assume that the drive voltage at the time of writing the pixel data is Vda. In this case, when the voltage between the drain and source of the drive transistor T1 is taken as Vdsa, and the voltage between the anode and cathode of the LED 12 is taken as Vea, the following Equation (1) holds.

$$Vda = Vdsa + Vea \quad (1)$$

After writing the pixel data, when the drive voltage drops from Vda to Vdb due to writing to other pixels, the voltage between the drain and source of the drive transistor T1 and the voltage between the anode and cathode of the LED 12 also change. When the voltage between the drain and source of the drive transistor T1 after the change is taken as Vdsb, and the voltage between the anode and cathode of the LED 12 after the change is taken as Veb, the following Equation (2) holds.

$$Vdb = Vdsb + Veb \quad (2)$$

Figure 4:
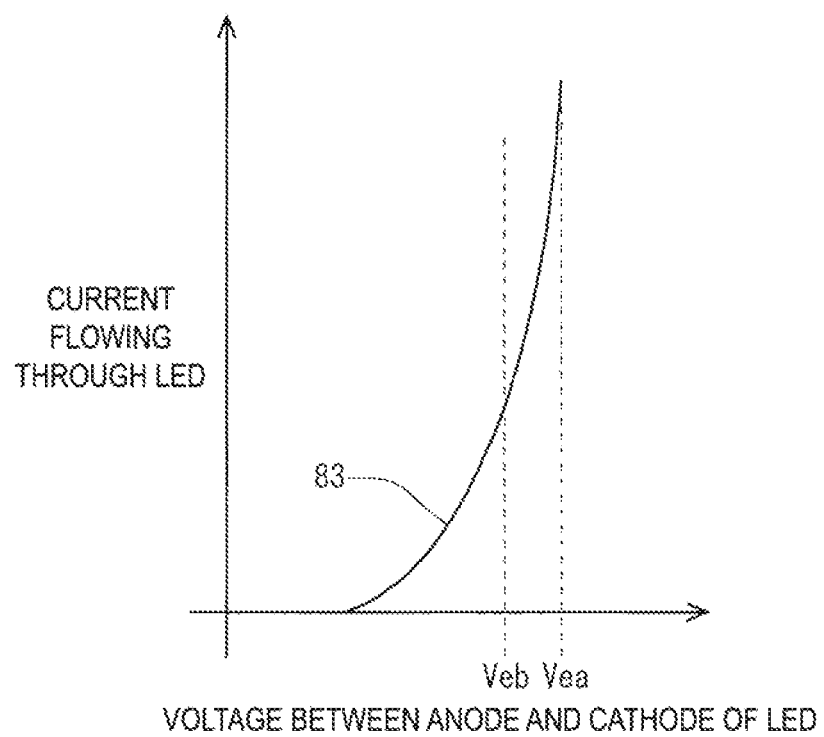
FIG. 4 is a diagram showing a relationship between a voltage between an anode and a cathode of an LED, and a current flowing through the LED.

As is understood from Equations (1) and (2) described above, when the drive voltage drops from Vda to Vdb due to its voltage drop, the voltage between the drain and source of the drive transistor T1 and the voltage between the anode and cathode of the LED 12 also drop. A relationship between the voltage between the anode and cathode of the LED 12, and the current flowing through the LED 12 is represented by a curved line denoted by a reference sign 83 in FIG. 4. As is understood from FIG. 4, when the voltage between the anode and cathode of the LED 12 drops from Vea to Veb, the current flowing through the LED 12 decreases. Because of this, the luminance of the LED 12 is lowered.

Figure 5:
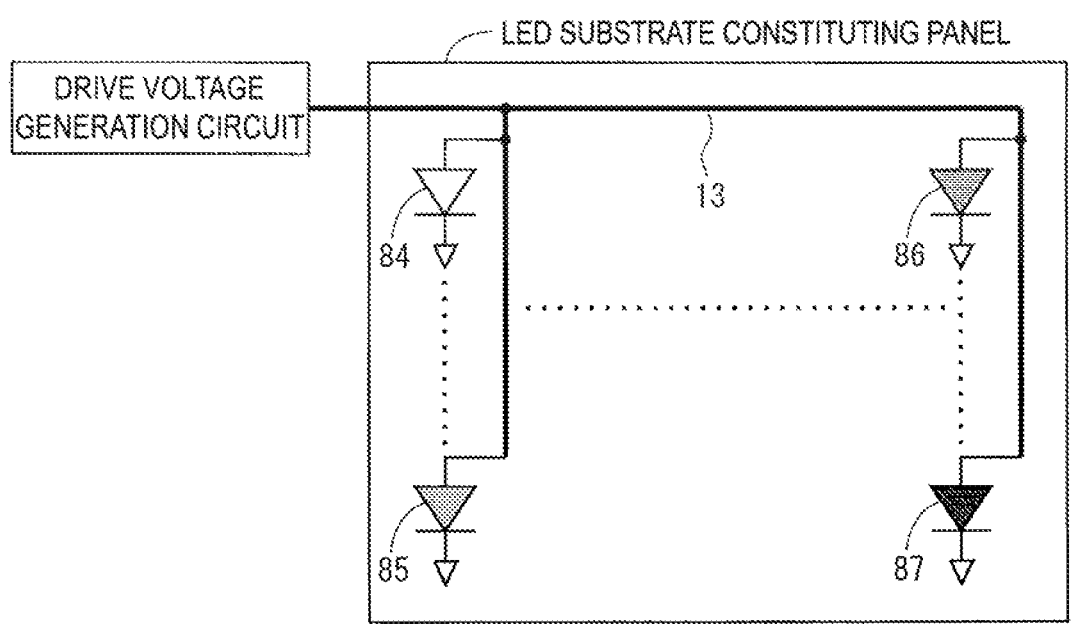
FIG. 5 is a diagram describing that as a pixel is distanced far from a power supply (a drive voltage generation circuit) for generating a drive voltage, luminance becomes small.

As described above, the adverse effects brought about by the voltage drop of the drive voltage include the adverse effect caused by the voltage drop of the drive voltage at the writing time of the pixel data (hereinafter, referred to as a "first adverse effect", for convenience) and the adverse effect caused by the voltage drop of the drive voltage at the non-writing time of the pixel data (hereinafter, referred to as a "second adverse effect", for convenience). As for the first adverse effect, even when writing based on the same data value is performed on all the pixels, as a pixel is distanced far from the power supply generating the drive voltage (the drive voltage generation circuit), the luminance of the pixel becomes low. For example, in FIG. 5, the luminance of an LED denoted by a reference sign 85 is lower than the luminance of an LED denoted by a reference sign 84. The luminance of an LED denoted by a reference sign 86 is lower than the luminance of the LED denoted by the reference sign 84, and the luminance of an LED denoted by a reference sign 87 is further lower than the luminance of the LED denoted by the reference sign 86. The above-described first adverse effect is dependent on the voltage value of the drive voltage wiring line 13 at the time of writing the pixel data, and thus it is possible to reduce a variation in the in-plane luminance by using the technique disclosed in JP 2009-31451 A. In contrast, the second adverse effect cannot be removed by known techniques. This is described below.

Figure 6:
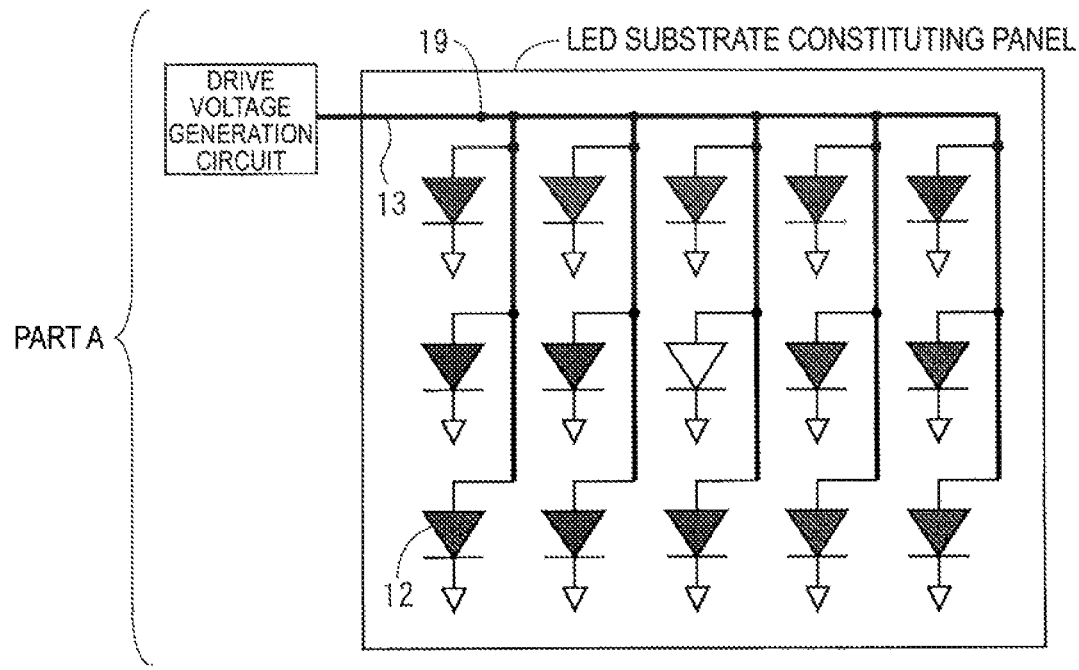
Figure 6:
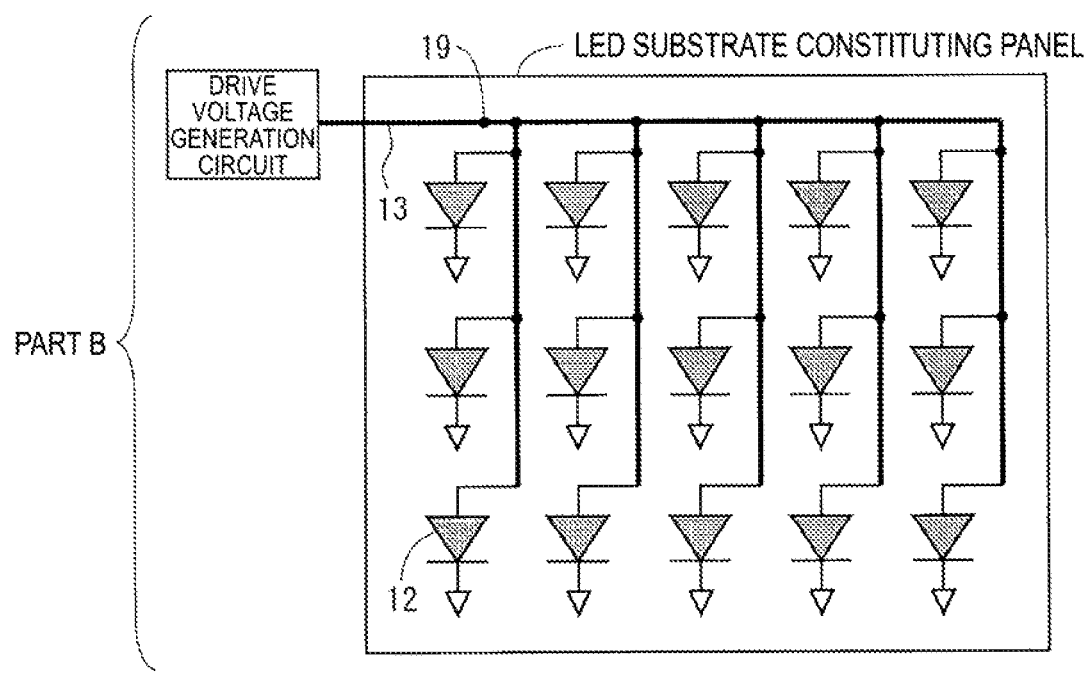

Even when a variation in magnitude of the voltage drop of the drive voltage due to the distance from the power supply generating the drive voltage (the drive voltage generation circuit) is suppressed, the luminance of a pixel including the lighting target LED 12 differs between a case in which only the LED 12 of one pixel is turned on and a case in which the LEDs 12 of a large number of pixels are turned on (note that the goal lighting luminance is assumed to have a constant level of luminance). This phenomenon is schematically illustrated in FIG. 6. A display state of a case in which only the LED 12 of one pixel located in the center is turned on is depicted in a part A of FIG. 6, and a display state of a case in which the LEDs 12 of all the pixels are turned on is depicted in a part B of FIG. 6. When the LED 12 of the pixel located in the center on the LED substrate is paid attention to, the luminance in the part A and the luminance in the part B should be the same, but the luminance in the part B is lower than that in the part A. This is because the total amount of current flowing through the drive voltage wiring line 13 varies depending on the number of LEDs 12 being turned on.

The drive voltage output from the drive voltage generation circuit is taken as Va, the voltage of the drive voltage wiring line 13 at a portion (node) denoted by a reference sign 19 in FIG. 6 with regard to the case in which only the LED 12 of one pixel in the center is turned on is taken as Vb1, and the voltage of the drive voltage wiring line 13 at the portion (node) denoted by the reference sign 19 in FIG. 6 with regard to the case in which the LEDs 12 of all pixels (the number of pixels is taken as Np) are turned on is taken as Vb2. A current to be supplied to all the pixels flows through the drive voltage wiring line 13 between the drive voltage generation circuit and the node 19. Accordingly, the voltage drop of the drive voltage between the drive voltage generation circuit and the node 19 is considerably large. When a current supplied to a pixel including the lighting target LED 12 is taken as i, and wiring line resistance between the drive voltage generation circuit and the node 19 is taken as R, the voltage Vb1 is represented by Equation (3) given below, and the voltage Vb2 is represented by Equation (4) given below.

$$Vb1 = Va - R \times i \quad (3)$$

$$Vb2 = Va - R \times (i \times Np) \quad (4)$$

For example, the number of pixels of an FHD display device for RGB color display is "1920×1080×3". In this case, "R×(i×Np)" in Equation (4) is 6220800 times "R×i" in Equation (3). Thus, the degree of the voltage drop of the drive voltage varies depending on data values of the pixels in the entire display portion. When the voltage of the node 19 fluctuates, the voltage between the anode and cathode of the LED 12 in each pixel changes and the current flowing through the LED 12 changes. As a result, even when writing based on the same data value is performed, the luminance of the pixel changes depending on the overall display state.

Then, in each of the following embodiments, a drive voltage adjustment circuit for adjusting the voltage value of the drive voltage is provided in the light-emitting device, for example, in order to suppress the fluctuation in voltage of the node 19. Hereinafter, configurations common to all the embodiments will be described first, and then each embodiment will be described in detail.

0.2 Configurations Common to All Embodiments

Figure 1:
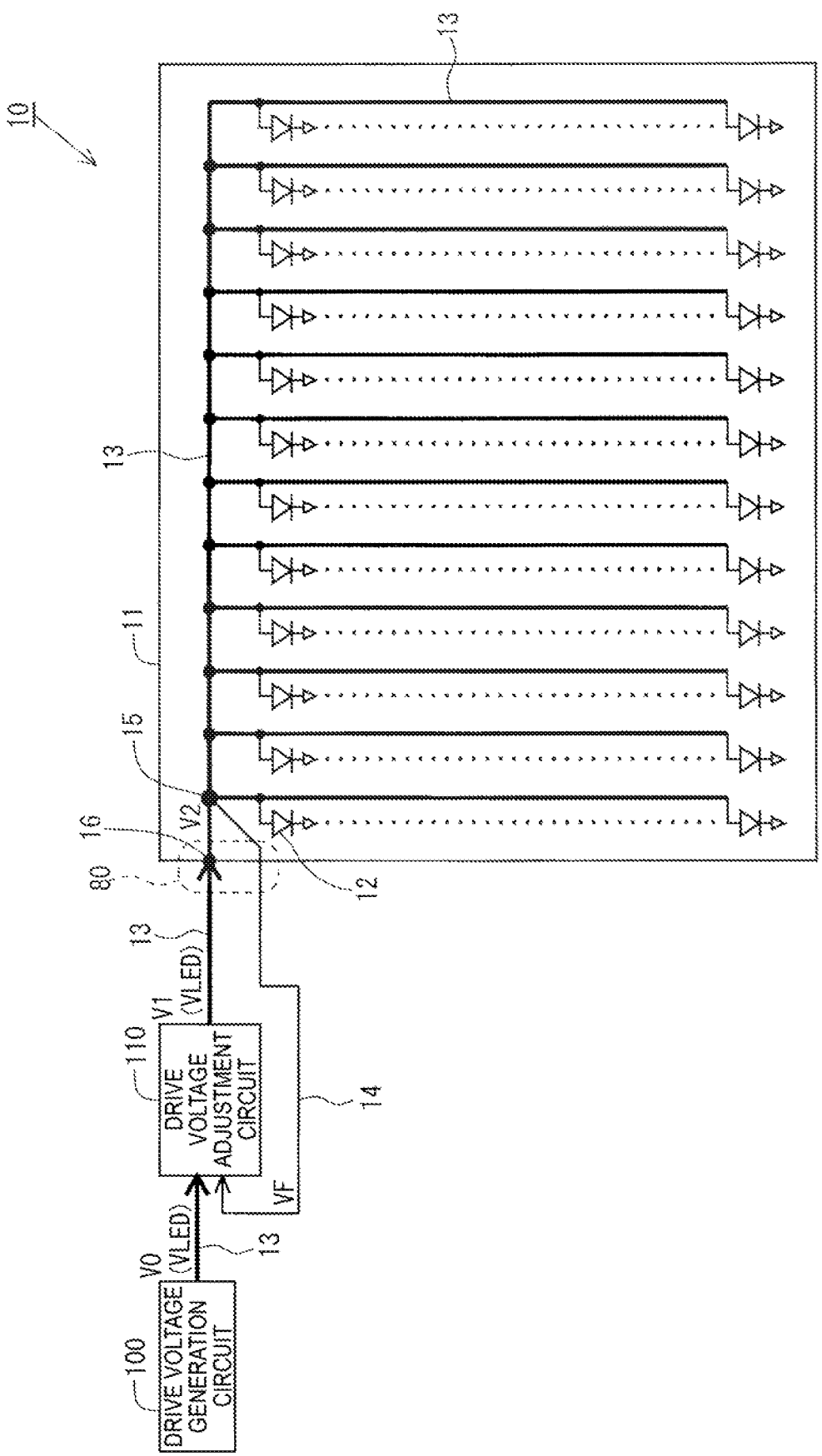
FIG. 1 is a diagram illustrating a schematic configuration of a light-emitting device in all embodiments.

FIG. 1 is a diagram illustrating a schematic configuration of a light-emitting device 10 of all the embodiments. In a first embodiment, the LED 12 in the light-emitting device 10 is used as a display element, and in second and third embodiments, the light-emitting device 10 is used as a backlight of a liquid crystal display device.

As illustrated in FIG. 1, the light-emitting device 10 includes an LED substrate 11, a drive voltage generation circuit 100, and a drive voltage adjustment circuit 110. A plurality of the LEDs 12 are mounted on the LED substrate 11 in a matrix shape, for example. The drive voltage generation circuit 100 generates a voltage V0 (hereinafter referred to as a "drive source voltage") as a drive voltage VLED for driving the plurality of LEDs 12. As described above, the drive voltage generation circuit 100 functions as a power supply configured to generate the drive voltage VLED. The voltage value of the drive source voltage V0 is determined in consideration of the forward voltage of the LED 12 in the light-emitting device 10. The drive voltage adjustment circuit 110 adjusts the voltage value of the drive voltage VLED and outputs a voltage V1 after adjustment (hereinafter, referred to as an "adjusted voltage") as the drive voltage VLED.

Figure 7:
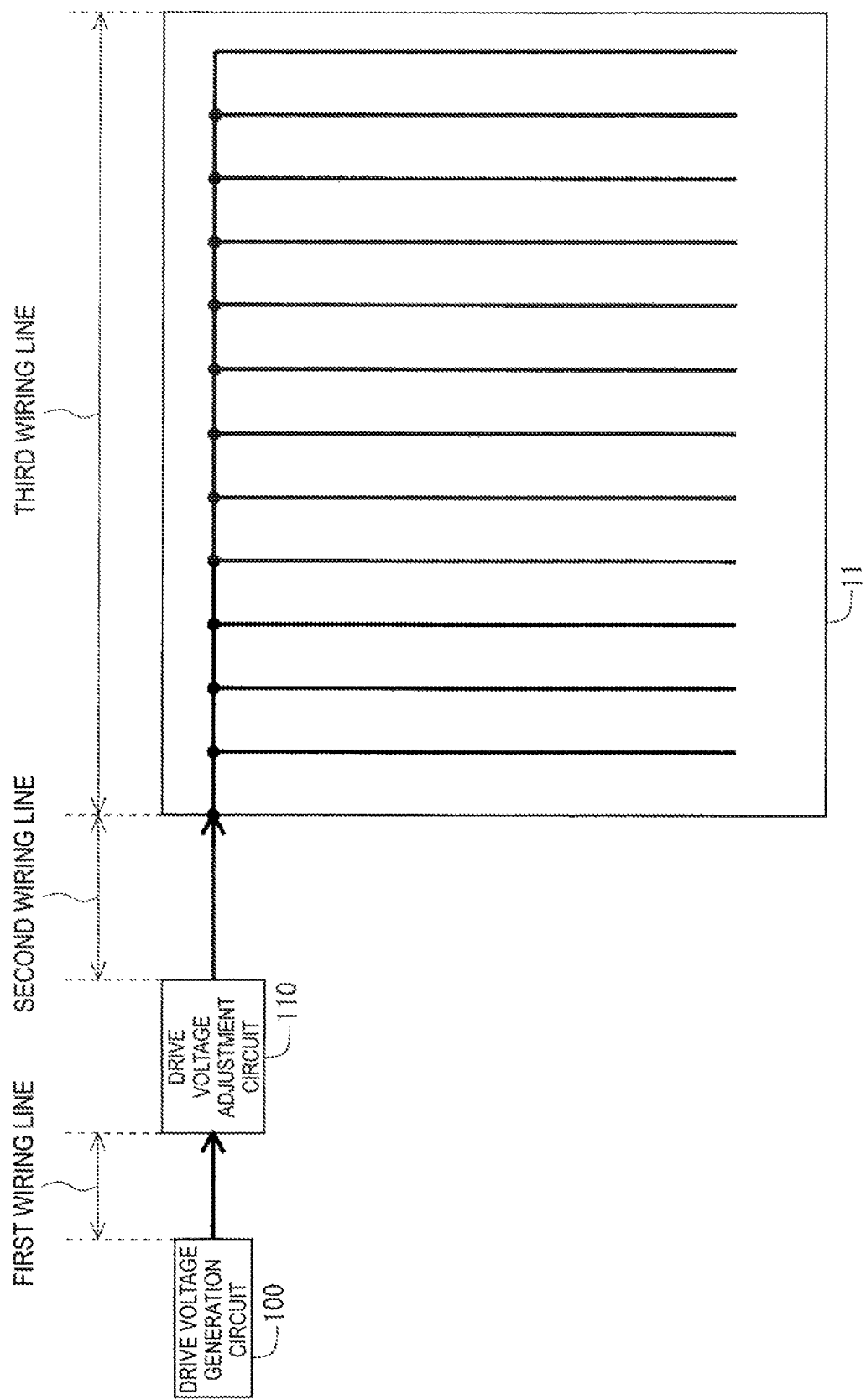
FIG. 7 is a diagram describing first to third wiring lines regarding all the embodiments.

The drive voltage VLED is supplied to each of the LEDs 12 on the LED substrate 11 by the drive voltage wiring line 13. The drive voltage wiring line 13 may roughly be divided into three wiring lines; hereinafter, as illustrated in FIG. 7, the drive voltage wiring line 13 disposed between the drive voltage generation circuit 100 and the drive voltage adjustment circuit 110 is referred to as a "first wiring line", the drive voltage wiring line 13 disposed between the drive voltage adjustment circuit 110 and the LED substrate 11 is referred to as a "second wiring line", and the drive voltage wiring line 13 disposed on the LED substrate 11 is referred to as a "third wiring line".

As illustrated in FIG. 1, the drive voltage wiring line 13 as the third wiring line is branched at a large number of branch points on the LED substrate 11 in such a manner that the drive voltage VLED is supplied to the plurality of LEDs 12. When a portion where the drive voltage VLED is input to the LED substrate 11 (a portion denoted by a reference sign 16 in FIG. 1) (a connection point between the second wiring line and the third wiring line) is defined as a "drive voltage input node", in order that the voltage of a branch point (hereinafter, referred to as a "main branch node") 15 closest to the drive voltage input node among the large number of branch points on the LED substrate 11 is fed back to the drive voltage adjustment circuit 110, a feedback wiring line 14 is typically disposed between the main branch node 15 and the drive voltage adjustment circuit 110. Note that a voltage VF fed back to the drive voltage adjustment circuit 110 (hereinafter, simply referred to as a "feedback voltage VF") is not limited to the voltage of the main branch node 15, and may be a voltage of one point on the drive voltage wiring line 13 between the drive voltage input node 16 and the main branch node 15. In other words, it is sufficient that the main branch node 15 is taken as a voltage detection target node or one point located between the drive voltage input node 16 and the main branch node 15 is taken as a voltage detection target node, and the feedback wiring line 14 connecting the voltage detection target node and the drive voltage adjustment circuit 110 is provided. Hereinafter, for convenience, the voltage of the voltage detection target node is referred to as a "reference point voltage", and a reference sign V2 is assigned to the reference point voltage. Because a current flowing through the feedback wiring line 14 is significantly smaller than the current flowing through the drive voltage wiring line 13, a voltage drop generated on the feedback wiring line 14 may be ignored.

With the configuration described above, the drive source voltage V0 output from the drive voltage generation circuit 100 and the feedback voltage VF are input to the drive voltage adjustment circuit 110. Then, in accordance with a difference between the drive source voltage V0 and the feedback voltage VF, the adjusted voltage V1 higher than the drive source voltage V0 is output from the drive voltage adjustment circuit 110 as the drive voltage VLED. As described above, the drive voltage adjustment circuit 110 outputs, in accordance with the difference between the voltage supplied by the drive voltage wiring line 13 as the first wiring line and the voltage supplied by the feedback wiring line 14, the adjusted voltage V1 higher than the voltage supplied by the drive voltage wiring line 13 as the first wiring line to the drive voltage wiring line 13 as the second wiring line. The adjustment of the voltage value of the drive voltage VLED in the drive voltage adjustment circuit 110 is to control the adjusted voltage V1 in such a manner that the feedback voltage VF and the drive source voltage V0 become equal to each other.

The drive voltage adjustment circuit 110 is provided on a circuit substrate separate from the LED substrate 11, and a connector and a cable are present in a portion denoted by a reference sign 80 in FIG. 1. As a result, an incident in which the reference point voltage V2 is not correctly fed back as the feedback voltage VF to the drive voltage adjustment circuit 110 due to an insertion failure of the cable or the like may be brought about. For example, when the feedback voltage VF is fixed to 0 V, it is conceivable that the drive voltage adjustment circuit 110 continues to perform control to compensate the difference between the adjusted voltage V1 and 0 V, whereby an uncontrollable situation is brought about resulting in a breakdown of the drive voltage adjustment circuit 110. Accordingly, as described below, the drive voltage adjustment circuit 110 is equipped with, in addition to the function of controlling the adjusted voltage V1 so that the feedback voltage VF becomes equal to the drive source voltage V0, a function of monitoring whether the reference point voltage V2 is correctly fed back, and a function of stopping the output of the drive voltage VLED (the output to the drive voltage wiring line 13 as the second wiring line) from the drive voltage adjustment circuit 110 when failure (an incident that the reference point voltage V2 is not correctly fed back) is detected.

Figure 8:
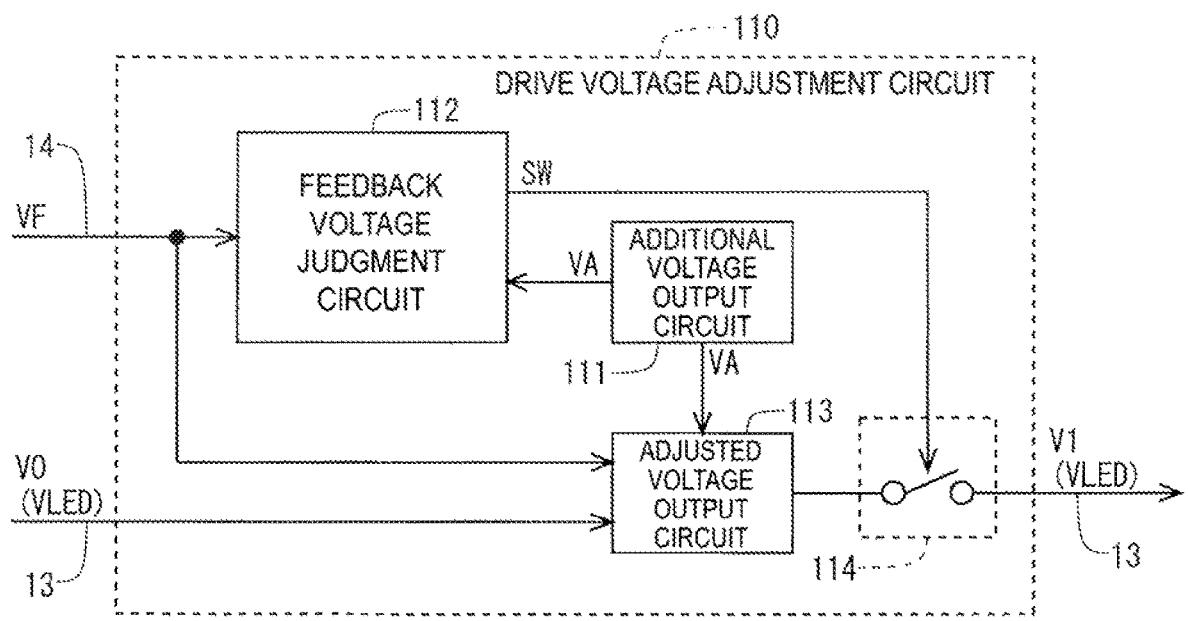
FIG. 8 is a block diagram illustrating a configuration of a drive voltage adjustment circuit of all the embodiments.

FIG. 8 is a block diagram illustrating a configuration of the drive voltage adjustment circuit 110. The drive voltage adjustment circuit 110 includes an additional voltage output circuit 111, a feedback voltage judgment circuit 112, an adjusted voltage output circuit 113, and a switch 114. A drive voltage output control switch is implemented by the switch 114, and a drive voltage output control circuit is implemented by the feedback voltage judgment circuit 112 and the switch 114.

The additional voltage output circuit 111 generates an additional voltage VA considering an expected voltage drop due to connection resistance between the cable and the connector in the portion denoted by the reference sign 80 in FIG. 1 and wiring line resistance of the drive voltage wiring line 13 on the LED substrate 11 and outputs the generated additional voltage VA. For example, when all the LEDs 12 are turned on at the maximum luminance (that is, when the current value of the drive voltage wiring line 13 is maximized), in the case where the value of the expected voltage drop generated between the adjusted voltage output circuit 113 and the voltage detection target node is taken as Vdrop, and the drive voltage (goal drive voltage) to be supplied to the LED 12 on the LED substrate 11 is taken as VZ, the additional voltage output circuit 111 generates and outputs the additional voltage VA satisfying Relationship (5) given below (except for a period immediately after start-up of the light-emitting device 10).

$$VA > VZ + Vdrop \quad (5)$$

Figure 9:
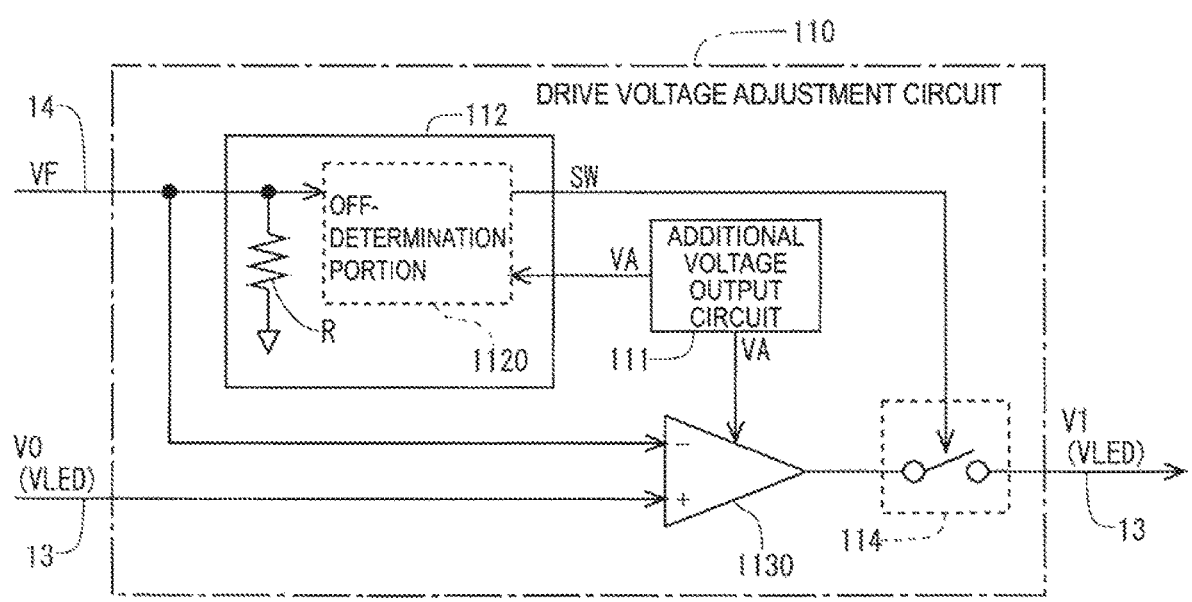
FIG. 9 is a diagram illustrating an example of a detailed configuration of a drive voltage adjustment circuit of all the embodiments.

The feedback voltage judgment circuit 112 outputs a control signal SW for controlling the on/off of the switch 114 based on the feedback voltage VF and the additional voltage VA. As illustrated in FIG. 9, the feedback voltage judgment circuit 112 is constituted by an off-determination portion 1120 and a pull-down resistor R. In the example illustrated in FIG. 9, the adjusted voltage output circuit 113 is implemented by an operational amplifier 1130. As is understood from FIG. 9, the feedback wiring line 14 is connected to the pull-down resistor R. The resistance value of the pull-down resistor R is set to a value greater than or equal to 1000 times the wiring line resistance value of the feedback wiring line 14. Thus, when the connection of the cable as the feedback wiring line 14 is normal and the reference point voltage V2 described above is successfully fed back as the feedback voltage VF, the reference point voltage V2 is detected by the off-determination portion 1120. On the other hand, in a case where the connection state of the cable as the feedback wiring line 14 is incomplete and the feedback wiring line 14 is electrically in a floating state, the voltage of a ground GND is generally detected by the off-determination portion 1120. However, in the configuration illustrated in FIG. 9, because the feedback wiring line 14 is also connected to an inverting input terminal (negative terminal) of the operational amplifier 1130, even when the connection state of the cable as the feedback wiring line 14 is incomplete, the voltage of a significant value is detected by the off-determination portion 1120 due to effects of other input voltages to the operational amplifier 1130. Thus, in the off-determination portion 1120, the feedback voltage VF and a comparison voltage Vt being set in consideration of a voltage that may be generated by the effects of other input voltages to the operational amplifier 1130 are compared.

The additional voltage VA is also taken into consideration for determining whether to make the switch 114 in an off state. Regarding this, immediately after the start-up of the light-emitting device 10, the voltage value of the additional voltage VA is not a desired voltage value, and the voltage value of the feedback voltage VF is lower than the original value. In such a case, the switch 114 should not be made to be in the off state. Thus, when the additional voltage VA is lower than the goal drive voltage VZ, the control signal SW is output from the feedback voltage judgment circuit 112 in such a manner that the switch 114 is maintained in the on state even when the feedback voltage VF is lower than or equal to the comparison voltage Vt.

As described above, when the feedback voltage VF is equal to or lower than the comparison voltage Vt and the additional voltage VA is equal to or higher than the goal drive voltage VZ, the feedback voltage judgment circuit 112 outputs the control signal SW in such a manner as to make the switch 114 be in the off state. On the other hand, when the feedback voltage VF is higher than the comparison voltage Vt or when the additional voltage VA is lower than the goal drive voltage VZ, the feedback voltage judgment circuit 112 outputs the control signal SW in such a manner as to make the switch 114 be in the on state. The voltage value of the comparison voltage Vt is set to a constant value determined by the circuit configuration.

The adjusted voltage output circuit 113 outputs, to the drive voltage wiring line 13 as the second wiring line, the adjusted voltage V1 obtained by adding a voltage corresponding to the difference between the drive source voltage V0 and the feedback voltage VF to the drive source voltage V0. The adjusted voltage output circuit 113 is implemented, for example, by the operational amplifier 1130 as illustrated in FIG. 9. As for the operational amplifier 1130 illustrated in FIG. 9, the inverting input terminal (negative terminal) is connected to the feedback wiring line 14, a non-inverting input terminal (positive terminal) is connected to the drive voltage wiring line 13 as the first wiring line, and an output terminal is connected to the drive voltage wiring line 13 as the second wiring line via the switch 114. The operational amplifier 1130 acts in such a manner as to cause a difference between the input voltage to the non-inverting input terminal and the input voltage to the inverting input terminal to be approximately 0. Accordingly, when the feedback voltage VF is supplied to the inverting input terminal and the drive source voltage V0 is supplied to the non-inverting input terminal, the adjusted voltage V1 is output from the operational amplifier 1130 so that the feedback voltage VF comes to be approximately equal to the drive source voltage V0. As described above, because a voltage higher than the drive source voltage V0 needs to be output from the operational amplifier 1130, the above-described additional voltage VA is supplied as a positive side power supply voltage to the operational amplifier 1130.

The state of the switch 114 is controlled by the control signal SW output from the feedback voltage judgment circuit 112. In general, the switch 114 is maintained in the on state. When the switch 114 is in the on state, the adjusted voltage V1 is output from the drive voltage adjustment circuit 110 as the drive voltage VLED. When the feedback voltage VF is equal to or lower than the comparison voltage Vt and the additional voltage VA is equal to or higher than the goal drive voltage VZ, the switch 114 is set to be in the off state. When the switch 114 is in the off state, the output of the drive voltage VLED from the drive voltage adjustment circuit 110 (the output thereof to the drive voltage wiring line 13 as the second wiring line) is stopped.

As described above, during regular operation, the drive voltage adjustment circuit 110 compares the feedback voltage VF with the drive source voltage V0 to output the adjusted voltage V1, which is a voltage higher than the drive source voltage V0 by the difference between them, as the drive voltage VLED.

When wiring line resistance of the drive voltage wiring line 13 between the drive voltage adjustment circuit 110 and the drive voltage input node 16 (see FIG. 1) is taken as Rd, a current flowing through the drive voltage wiring line 13 is taken as Ia, and the reference point voltage is taken as V2a in the case where the drive source voltage V0 is assumed to be output from the drive voltage adjustment circuit 110, the reference point voltage V2a is represented by Equation (6) given below.

$$V2a = V0 - Rd \times Ia \quad (6)$$

As described above, the adjusted voltage V1, which is a voltage higher than the drive source voltage V0 by the difference between the feedback voltage VF and the drive source voltage V0, is output from the drive voltage adjustment circuit 110. Because the feedback voltage VF is equal to the reference point voltage during regular operation, the reference point voltage V2 at this time is represented by Equation (7) given below.

$$V2 = V0 + (V0 - V2a) - Rd \times Ia \quad (7)$$

By substituting Equation (6) described above into Equation (7), Equation (8) given below holds.

$$V2 = V0 \quad (8)$$

From Equation (8) described above, it is understood that the reference point voltage V2 becomes equal to the drive source voltage V0 through adjusting the voltage value of the drive voltage VLED by the drive voltage adjustment circuit 110. As described above, the effect of the voltage drop of the drive voltage VLED on a path extending to the first branch point (the main branch node 15) on the LED substrate 11 is eliminated, and thus the change in lighting luminance of the LEDs 12 due to the voltage drop of the drive voltage VLED is suppressed. By equalizing the wiring line resistance of the drive voltage wiring line 13 after the branch on the LED substrate 11, the generation of a variation in luminance of the LEDs 12 on the LED substrate 11 may be suppressed.

1. First Embodiment

1.1 Overall Configuration

Figure 10:
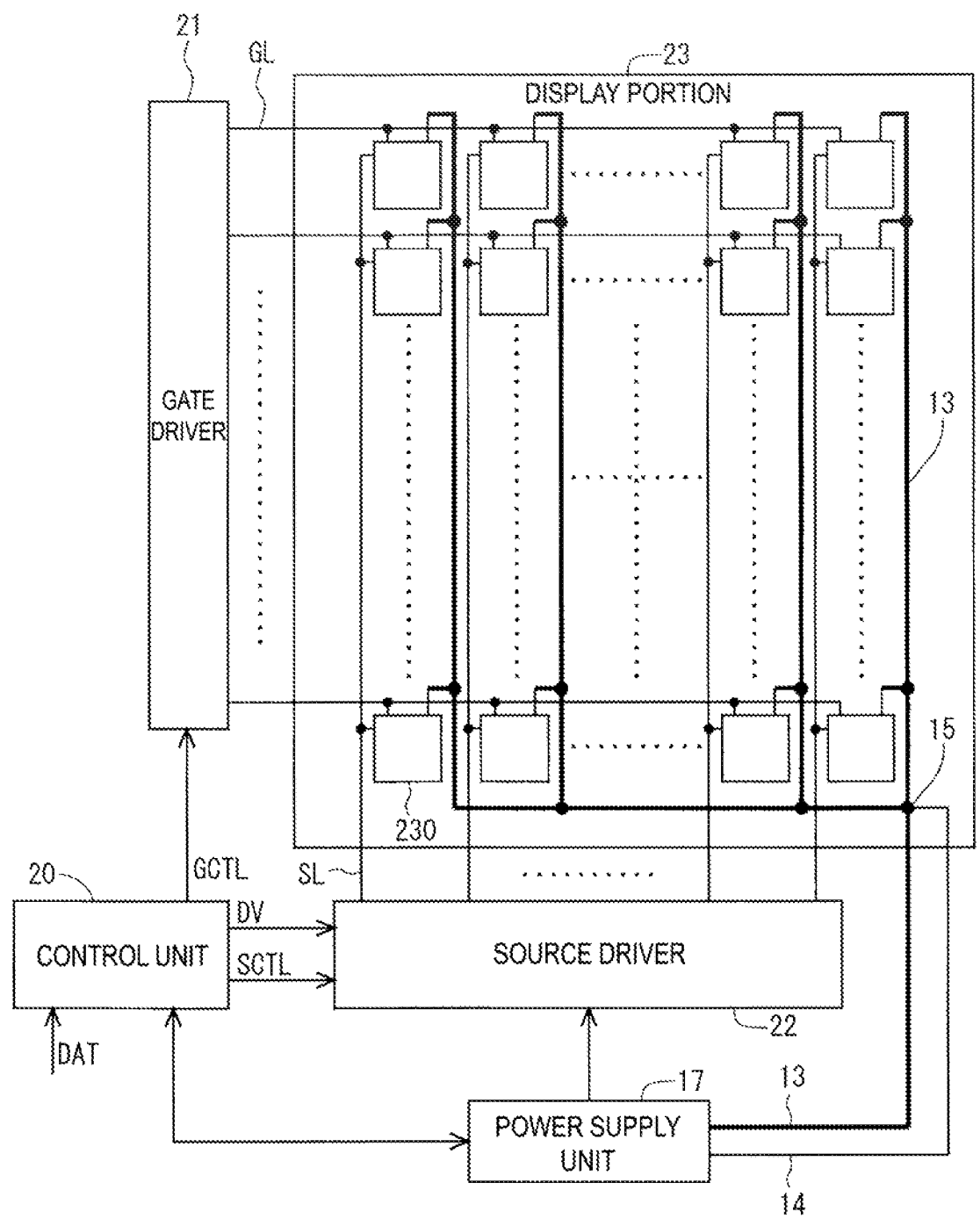
FIG. 10 is a block diagram illustrating an overall configuration of an organic EL display device according to a first embodiment.

FIG. 10 is a block diagram illustrating an overall configuration of an organic EL display device according to a first embodiment. As illustrated in FIG. 10, the organic EL display device includes a power supply unit 17, a control unit 20, a gate driver 21, a source driver 22, and a display portion 23. Between the power supply unit 17 and the control unit 20, transmission and/or reception of control signals is carried out at any time.

The display portion 23 includes the LED substrate 11 described above, and a plurality of the gate bus lines GL and a plurality of the source bus lines SL intersecting the plurality of gate bus lines GL are disposed on the LED substrate 11. The pixel unit 230 is provided corresponding to each of the intersections between the plurality of gate bus lines GL and the plurality of source bus lines SL. That is, the display portion 23 includes a plurality of the pixel units 230. The configuration of the pixel unit 230 takes the configuration as illustrated in FIG. 2. In the present embodiment, the LED 12 in the pixel unit 230 is an organic light-emitting diode (OLED). However, an LED of a significantly tiny size compared to existing LEDs, such as an LED called "mini LED", an LED called "micro LED" or the like may be employed as a display element. An n-channel type transistor may be employed as the drive transistor T1. The drive voltage wiring line 13 for supplying the drive voltage to the LED 12 inside the pixel unit 230 is also disposed in the display portion 23.

The power supply unit 17 supplies the drive voltage for driving the LED 12 to the display portion 23, and supplies a gray-scale voltage to the source driver 22. A specific configuration of the power supply unit 17 will be described later.

The control unit 20 receives image data DAT sent from outside, and outputs a digital video signal DV, a gate control signal GCTL for controlling action of the gate driver 21, and a source control signal SCTL for controlling action of the source driver 22.

The gate driver 21 is connected to the plurality of gate bus lines GL in the display portion 23. The gate driver 21 is constituted by a shift register, a logic circuit, and the like. The gate driver 21 drives the plurality of gate bus lines GL based on the gate control signal GCTL output from the control unit 20.

The source driver 22 is connected to the plurality of source bus lines SL in the display portion 23. The source driver 22 receives the digital video signal DV and source control signal SCTL output from the control unit 20, and applies data voltages to the plurality of source bus lines SL. The source control signal SCTL includes a source start pulse signal, a source clock signal, and a latch strobe signal. The source driver 22 includes a shift register with a plurality of bits, a sampling circuit, a latch circuit, a plurality of D/A converters, and the like, which are not illustrated. The shift register includes a plurality of registers that are cascade-connected. The shift register sequentially transfers a pulse of the source start pulse signal to be supplied to a first stage register from an input end to an output end based on the source clock signal. In response to this pulse transferring, sampling pulses are output from respective stages of the shift register. The sampling circuit stores the digital video signal DV based on the sampling pulses. The latch circuit acquires and holds the digital video signal DV for one row stored in the sampling circuit in accordance with the latch strobe signal. The D/A converters are provided corresponding to the respective source bus lines SL. The D/A converters convert the digital video signal DV held in the latch circuit into analog voltages. The resultant analog voltages are concurrently applied to all of the source bus lines SL as data voltages.

As described above, by the plurality of gate bus lines GL and plurality of source bus lines SL being driven, an image based on the image data DAT sent from outside is displayed in the display portion.

1.2 Configuration of Main Portion

Figure 11:
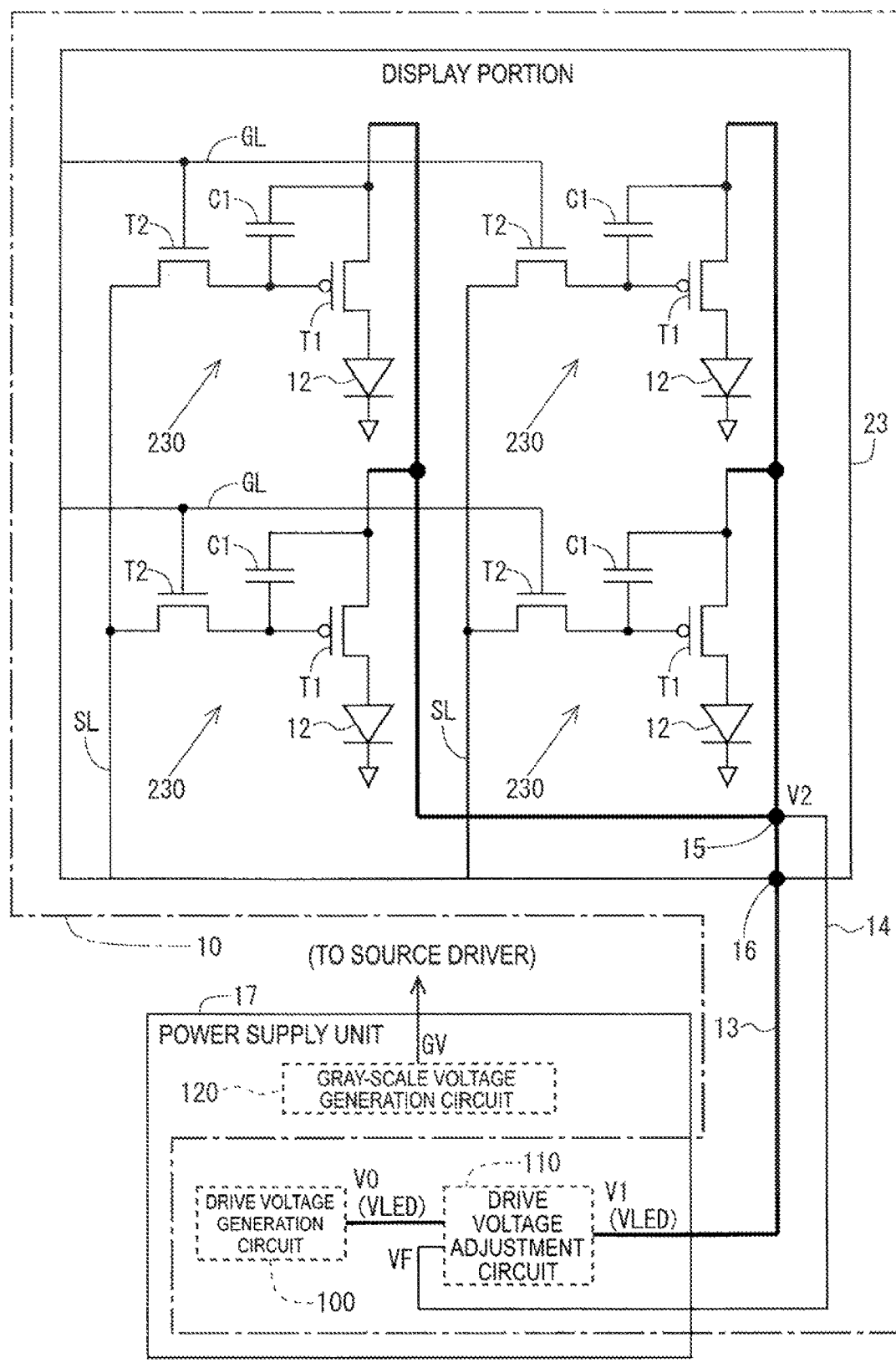
FIG. 11 is a diagram illustrating a configuration of a display portion and a power supply unit in the first embodiment.

FIG. 11 is a diagram illustrating a configuration of the display portion 23 and the power supply unit 17. However, for convenience, it is assumed that the number of pixels in the display portion 23 is four. The power supply unit 17 includes the drive voltage generation circuit 100, the drive voltage adjustment circuit 110, and a gray-scale voltage generation circuit 120. As described above, the drive voltage generation circuit 100 generates and outputs the drive source voltage V0 as the drive voltage VLED for driving the LEDs 12 in the display portion 23, and the drive voltage adjustment circuit 110 adjusts the voltage value of the drive voltage VLED based on the feedback voltage VF and outputs the adjusted voltage V1 as the drive voltage VLED. The gray-scale voltage generation circuit 120 generates a plurality of gray-scale voltages GV in accordance with the number of display gray scales. The plurality of gray-scale voltages GV are supplied to the source driver 22. In the above-described D/A converter inside the source driver 22, the gray-scale voltage GV is used for performing D/A conversion from the digital video signal DV to an analog voltage. In the present embodiment, the light-emitting device 10 is implemented by the drive voltage generation circuit 100, the drive voltage adjustment circuit 110, and the display portion 23.

As is understood from FIG. 11, the main branch node 15 in the display portion 23 is considered to be a voltage detection target node, and the feedback wiring line 14 is disposed between the main branch node 15 and the drive voltage adjustment circuit 110. With this, the reference point voltage V2 is fed back to the drive voltage adjustment circuit 110 as the feedback voltage VF. Subsequently, the voltage value of the drive voltage VLED is adjusted in the drive voltage adjustment circuit 110 as described above, and thus, during the action of the organic EL display device, the reference point voltage V2 is maintained substantially equal to the drive source voltage V0.

1.3 Effects

According to the present embodiment, in the organic EL display device, there are provided the drive voltage adjustment circuit 110 configured to adjust the voltage value of the drive voltage VLED for driving the plurality of LEDs 12 in the display portion 23, and the feedback wiring line 14 for feeding back the voltage of the voltage detection target node provided on the LED substrate 11, as the reference point voltage V2, to the drive voltage adjustment circuit 110. In this case, the main branch node 15, which is a branch point closest to the drive voltage input node 16 among a large number of branch points of the drive voltage wiring line 13 as the third wiring line on the LED substrate 11, is considered as the voltage detection target node. The drive voltage adjustment circuit 110 outputs, in accordance with the difference between the drive source voltage V0 output from the drive voltage generation circuit (the power supply configured to generate the drive voltage VLED) 100 and the feedback voltage VF supplied by the feedback wiring line 14, the adjusted voltage V1 higher than the drive source voltage V0 to the drive voltage wiring line 13 as the second wiring line as the drive voltage VLED. Specifically, the drive voltage adjustment circuit 110 outputs the adjusted voltage V1 to the drive voltage wiring line 13 as the second wiring line in such a manner as to make the feedback voltage VF equal to the drive source voltage V0. Accordingly, regardless of the magnitude of the drive current in the entire display portion 23, the voltage of the voltage detection target node on the LED substrate 11 is maintained to be approximately equal to the drive source voltage V0. With this, regardless of the display state of the entire display portion 23, the pixel units 230 where writing is performed based on the pixel data of the same data value light at the same luminance.

Figure 12:
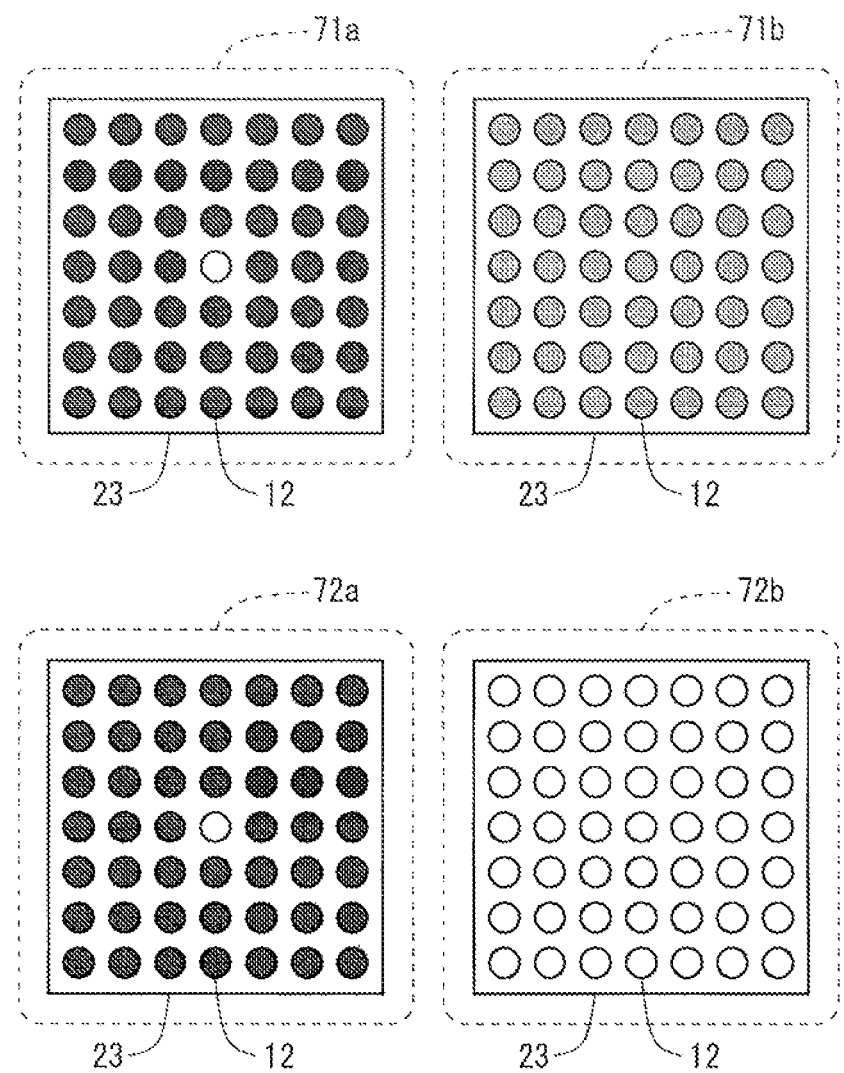
FIG. 12 is a diagram describing an effect of the first embodiment.

A difference between the display state of the related art and the display state obtained in the present embodiment will be described with reference to FIG. 12. In the following description, a case in which only the LED 12 in one pixel unit 230 located in the center of the display portion 23 is made to light at a certain specific luminance is referred to as a "first case", and a case in which the LEDs 12 in all the pixel units 230 inside the display portion 23 are made to light at the certain specific luminance is referred to as a "second case". In the related art, in the first case, a lighting state as depicted in a portion denoted by a reference sign 71a in FIG. 12 is obtained, and in the second case, a lighting state as depicted in a portion denoted by a reference sign 71b in FIG. 12 is obtained. In the pixel unit 230 located in the center of the display portion 23, the LED 12 has to light at the same luminance in both cases, but the luminance in the second case is lower than the luminance in the first case. In contrast, in the present embodiment, in the first case, a lighting state as depicted in a portion denoted by a reference sign 72a in FIG. 12 is obtained, and in the second case, a lighting state as depicted in a portion denoted by a reference sign 72b in FIG. 12 is obtained. In the pixel unit 230 located in the center of the display portion 23, the luminance of the first case is the same as the luminance of the second case.

As described above, according to the present embodiment, an organic EL display device using the light-emitting device 10 capable of suppressing a change in lighting luminance caused by the voltage drop of the drive voltage VLED of the LEDs 12 is implemented.

2. Second Embodiment

2.1 Overall Configuration

Figure 13:
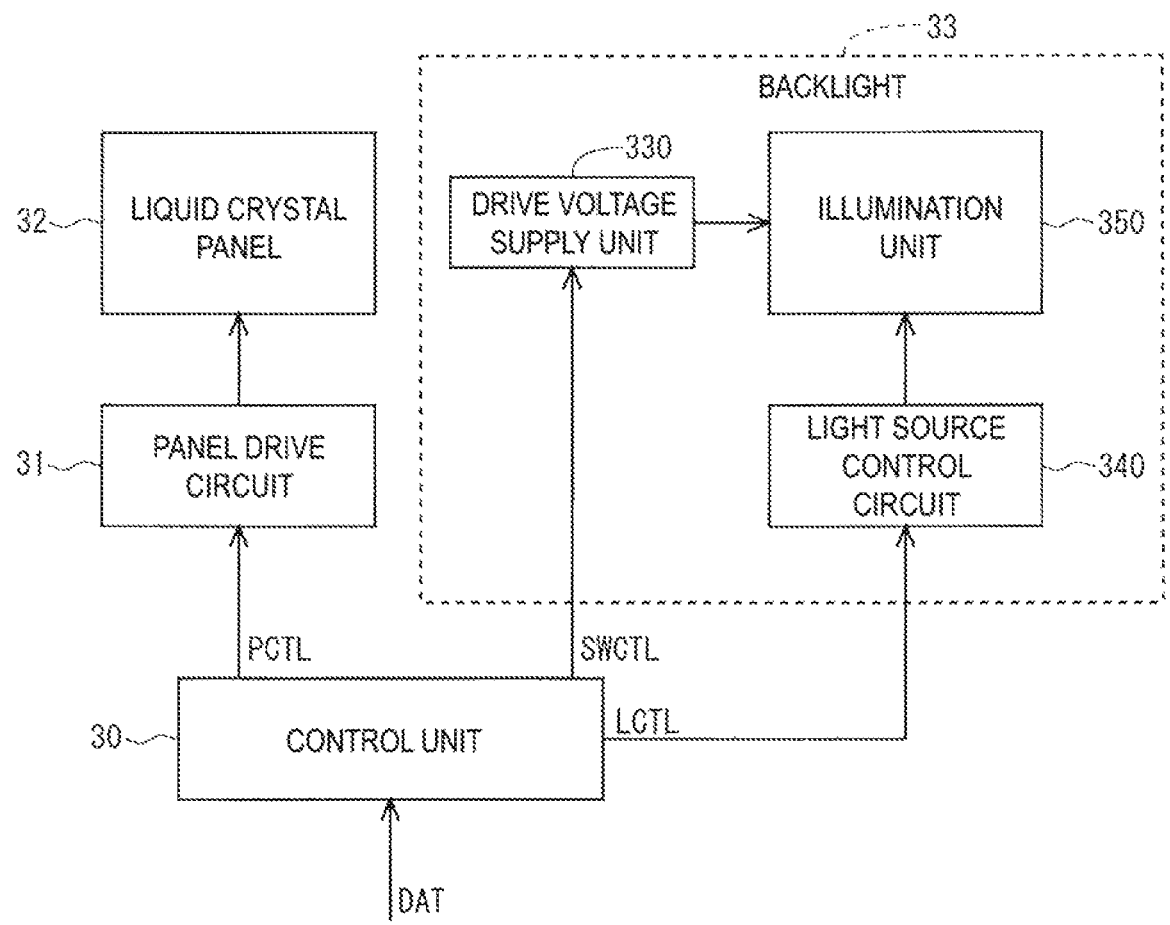
FIG. 13 is a block diagram illustrating an overall configuration of a liquid crystal display device according to a second embodiment.

FIG. 13 is a block diagram illustrating an overall configuration of a liquid crystal display device according to the second embodiment. The liquid crystal display device includes a control unit 30, a panel drive circuit 31, a liquid crystal panel 32, and a backlight (light-emitting device) 33. The liquid crystal panel 32 is formed with two opposing glass substrates and includes a display portion that displays an image. The backlight 33 is provided on the back face of the liquid crystal panel 32. The backlight 33 includes a drive voltage supply unit 330, a light source control circuit (LED driver) 340, and an illumination unit 350. As described below, the illumination unit 350 includes a plurality of LEDs 12. Passive driving is performed in the backlight 33 of the present embodiment.

Figure 14:
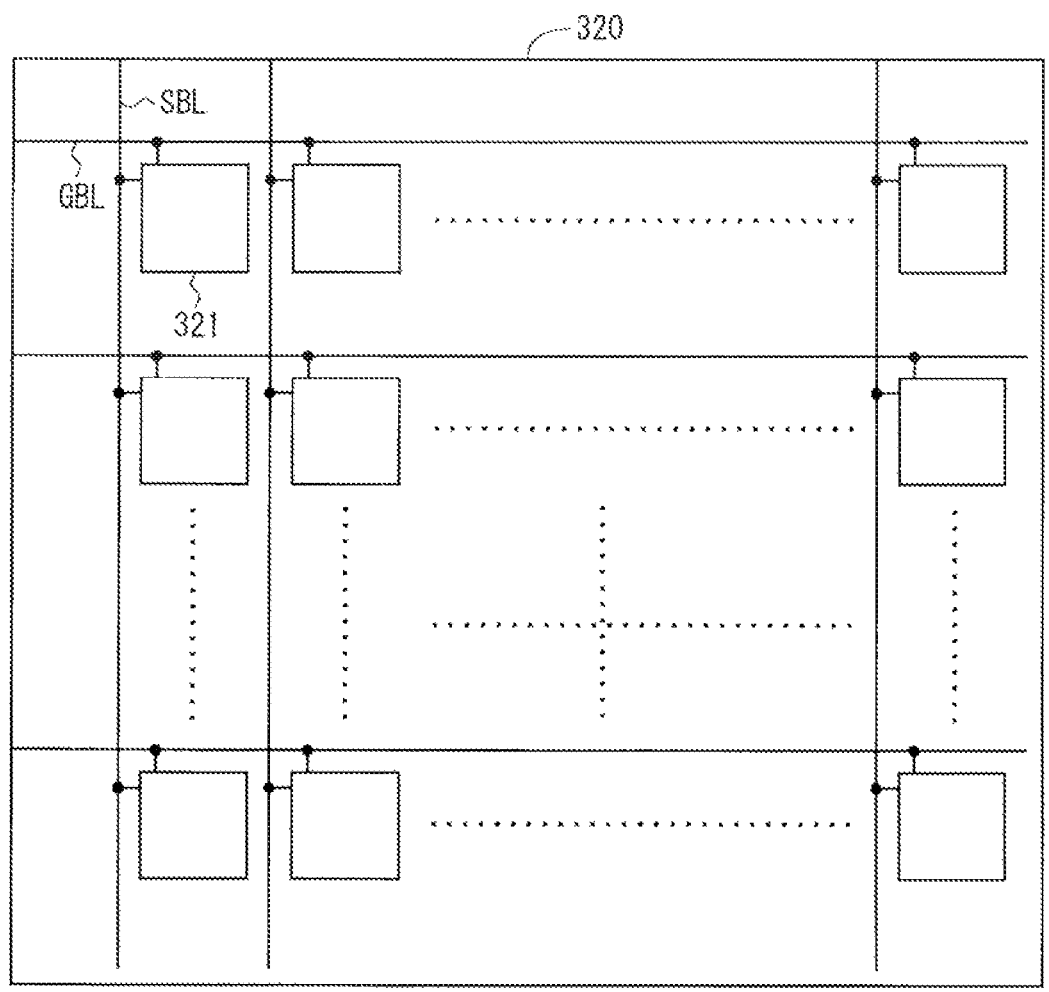
FIG. 14 is a diagram illustrating a schematic configuration of a display portion within a liquid crystal panel in the second embodiment.

As illustrated in FIG. 14, a plurality of gate bus lines GBL and a plurality of source bus lines SBL are disposed in a display portion 320 inside the liquid crystal panel 32. A pixel unit 321 is provided corresponding to each of intersections between the plurality of gate bus lines GBL and the plurality of source bus lines SBL. That is, the display portion 320 includes a plurality of the pixel units 321.

Figure 15:
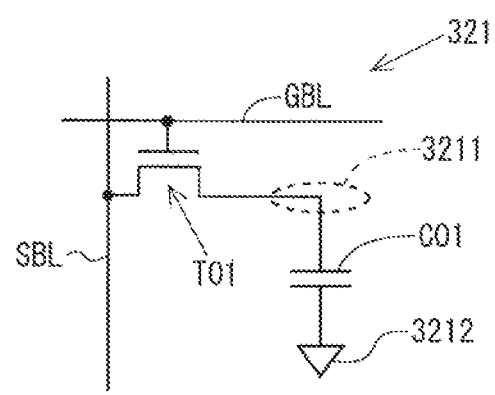
FIG. 15 is a circuit diagram illustrating a configuration of one pixel unit in the second embodiment.

FIG. 15 is a circuit diagram illustrating a configuration of one pixel unit 321. Each pixel unit 321 includes a pixel transistor T01, serving as a switching element, with a gate terminal connected to the gate bus line GBL passing through the corresponding intersection and with a source terminal connected to the source bus line SBL passing through the above corresponding intersection, a pixel electrode 3211 connected to a drain terminal of the pixel transistor T01, a common electrode 3212 applied with a constant voltage, and a liquid crystal capacitance C01 formed by the pixel electrode 3211 and the common electrode 3212. An auxiliary capacity may be provided in parallel with the liquid crystal capacitance C01 in some cases.

Next, actions of the constituent elements illustrated in FIG. 13 will be described. The control unit 30 receives the image data DAT sent from outside, and outputs a panel control signal PCTL for controlling the action of the panel drive circuit 31 and a luminance control signal LCTL for controlling the action of the light source control circuit 340 in such a manner that the above-described local dimming (processing for controlling the luminance of the LEDs 12 for each area) is performed. Further, the control unit 30 outputs a switch control signal SWCTL for controlling the action of the drive voltage supply unit 330. The panel control signal PCTL, the luminance control signal LCTL, and the switch control signal SWCTL are constituted of a plurality of control signals.

The panel drive circuit 31 drives the liquid crystal panel 32 based on the panel control signal PCTL sent from the control unit 30. Specifically, the panel drive circuit 31 is constituted by a gate driver that drives the gate bus line GBL and a source driver that drives the source bus line SBL. When the gate driver drives the gate bus line GBL and the source driver drives the source bus line SBL, a voltage corresponding to a goal display image is written to the liquid crystal capacitance C01 in each pixel unit 321.

The light source control circuit 340 controls the on/off of the supply of the current to each of the LEDs 12 in such a manner that each LED 12 in the illumination unit 350 emits light at desired luminance, based on the luminance control signal LCTL sent from the control unit 30.

The illumination unit 350 includes the plurality of LEDs 12. In other words, the plurality of LEDs 12 are mounted on the LED substrate 11 (not illustrated in FIG. 13) constituting the illumination unit 350. The supply of the current to each LED 12 is controlled by the light source control circuit 340, so that each LED 12 emits light at the desired luminance. In this manner, the illumination unit 350 irradiates the display portion 320 with light from the back face of the display portion 320.

As described above, in the state in which the voltage corresponding to the goal display image is written to the liquid crystal capacitance C01 in each of the pixel units 321 provided in the display portion 320 of the liquid crystal panel 32, the illumination unit 350 in the backlight 33 irradiates the display portion 320 with light from the back face thereof. As a result, an image based on the image data DAT sent from outside is displayed in the display portion 320.

2.2 Backlight

Figure 16:
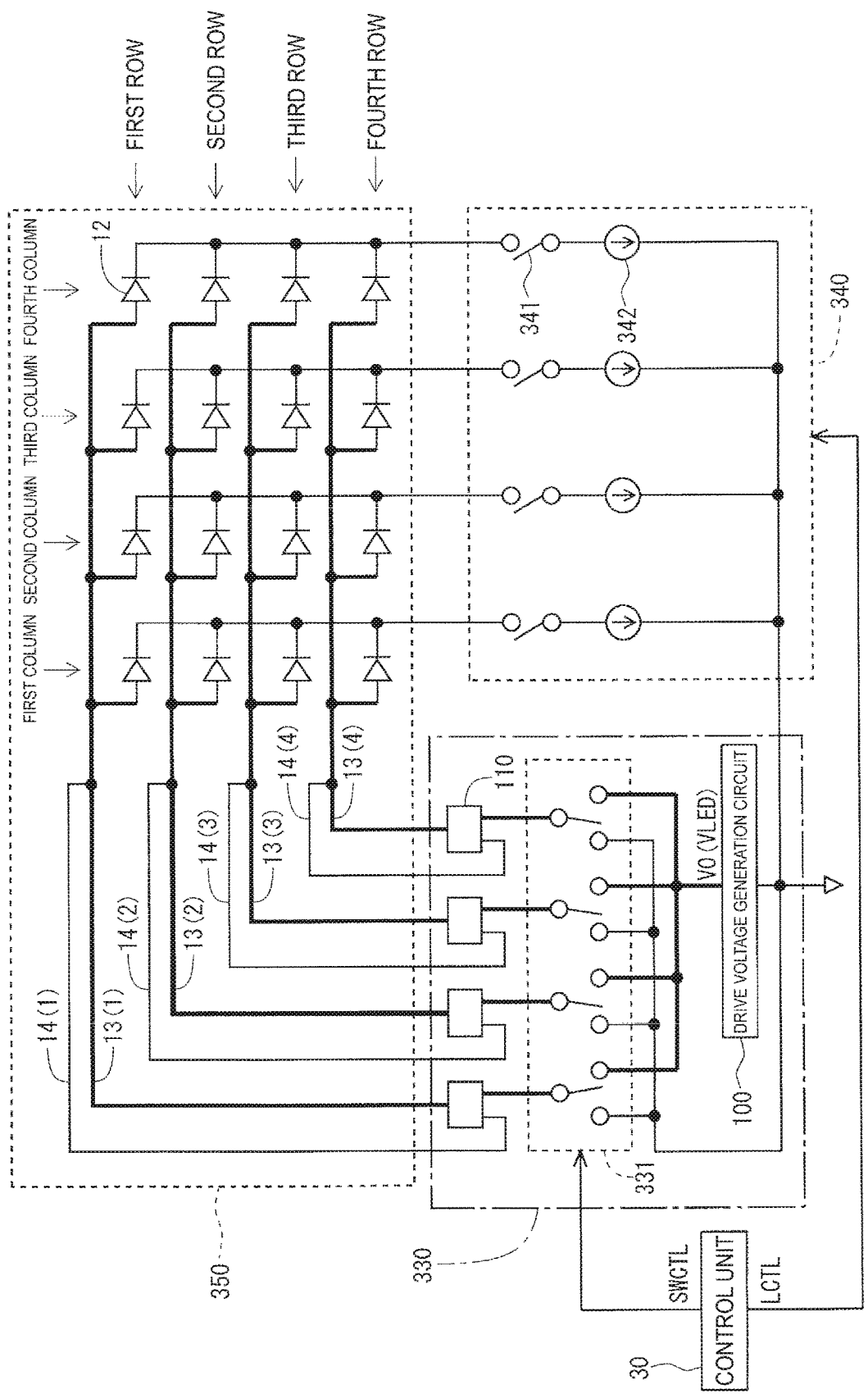
FIG. 16 is a schematic configuration diagram of a backlight of the second embodiment.
Figure 17:
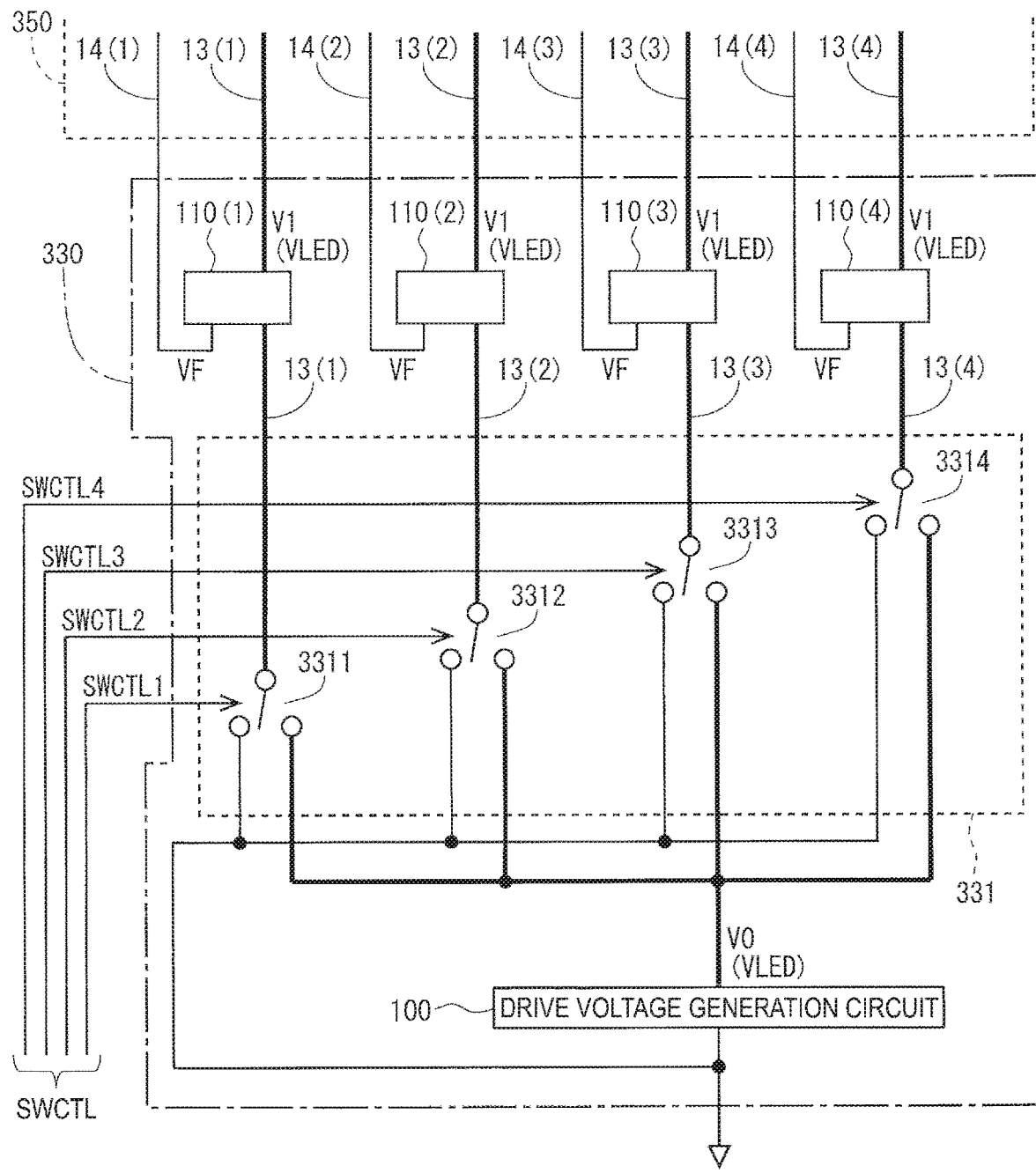
FIG. 17 is a diagram illustrating a configuration of a drive voltage supply unit of the second embodiment.

Referring to FIG. 16 and FIG. 17, a configuration of the backlight 33 of the present embodiment will be described. FIG. 16 is a schematic configuration diagram of the backlight 33. FIG. 17 is a diagram illustrating a configuration of the drive voltage supply unit 330. As described above, the backlight 33 includes the drive voltage supply unit 330, the light source control circuit 340, and the illumination unit 350.

The plurality of LEDs 12 are provided in a matrix shape in the illumination unit 350. For convenience, the description will be given assuming that there are 16 areas and 16 LEDs 12 (four rows by four columns) are provided in the illumination unit 350. The drive voltage wiring line 13 as the third wiring line is disposed corresponding to each of the rows in the illumination unit 350. The drive voltage wiring lines corresponding to the first to fourth rows are denoted by reference signs 13(1) to 13(4), respectively. Further, the feedback wiring line 14 is disposed corresponding to each of the rows in the illumination unit 350. The feedback wiring lines corresponding to the first to fourth rows are denoted by reference signs 14(1) to 14(4), respectively. The 16 LEDs 12 described above are divided into four blocks. In this configuration, one block is formed by four LEDs 12 included in one row.

In the light source control circuit 340, a switch 341 and a constant current source 342 are provided corresponding to each of the columns. In other words, the light source control circuit 340 is provided with the switches 341 and the constant current sources 342 of the number equal to the number of LEDs 12 included in each block. The switch 341 functions as a lighting control switch for controlling whether to supply a current to the corresponding LED 12. The on/off of the switch 341 is controlled by the luminance control signal LCTL sent from the control unit 30.

The drive voltage supply unit 330 includes the drive voltage adjustment circuit 110 corresponding to each row, a switching circuit 331, and the drive voltage generation circuit 100. As illustrated in FIG. 17, the switching circuit 331 is constituted by four switching switches 3311 to 3314 respectively corresponding to the first to fourth rows. The switch control signal SWCTL is constituted by four signals (switch control signals SWCTL1 to SWCTL4), and the connection states of the switching switches 3311 to 3314 are controlled by the switch control signals SWCTL1 to SWCTL4, respectively. In the present embodiment, each switching switch, when its corresponding switch control signal is at a high level, sets the connection destination of the drive voltage adjustment circuit 110 to the drive voltage generation circuit 100; when the corresponding switch control signal is at a low level, the connection destination of the drive voltage adjustment circuit 110 is set to the ground.

Figure 18:
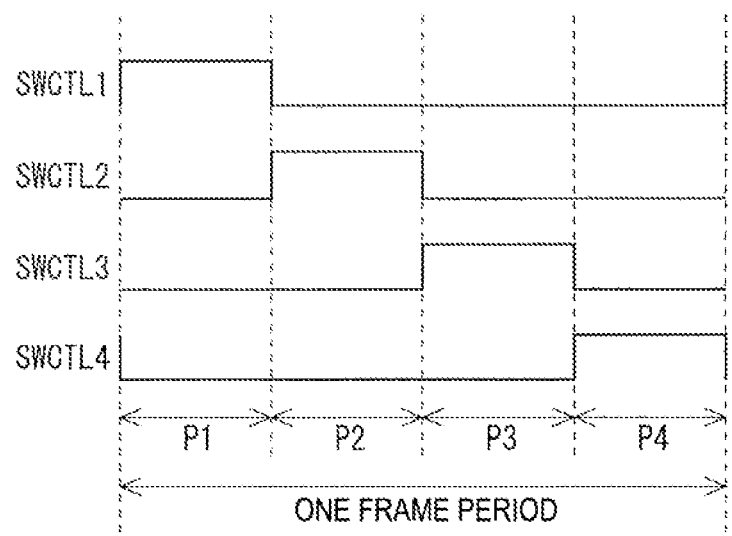
FIG. 18 is a waveform diagram of a switch control signal of the second embodiment.

In the configuration described above, waveforms of the switch control signals SWCTL1 to SWCTL4 change in each of frame periods as illustrated in FIG. 18. In a period P1, only the drive voltage adjustment circuit 110 corresponding to the drive voltage wiring line 13(1) is connected to the drive voltage generation circuit 100, and the LED 12 in the first row can be turned on. In a period P2, only the drive voltage adjustment circuit 110 corresponding to the drive voltage wiring line 13(2) is connected to the drive voltage generation circuit 100, and the LED 12 in the second row can be turned on. In a period P3, only the drive voltage adjustment circuit 110 corresponding to the drive voltage wiring line 13(3) is connected to the drive voltage generation circuit 100, and the LED 12 in the third row can be turned on. In a period P4, only the drive voltage adjustment circuit 110 corresponding to the drive voltage wiring line 13(4) is connected to the drive voltage generation circuit 100, and the LED 12 in the fourth row can be turned on. In the manner described above, the LEDs 12 are turned on sequentially row by row. As described above, the switching circuit 331 switches the supply destination of the drive voltage VLED generated by the drive voltage generation circuit 100 between a plurality of the blocks so that the LEDs 12 included in the illumination unit 350 are driven for each block. The luminance of each LED 12 is controlled by switching the on/off of the corresponding switch 341 based on the luminance control signal LCTL (that is, PWM control is performed).

Figure 19:
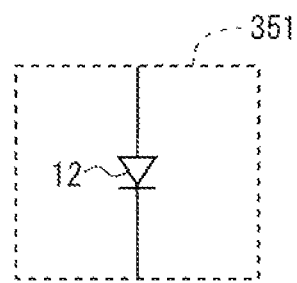
FIG. 19 is a diagram describing a configuration of an LED unit regarding the second embodiment.
Figure 20:
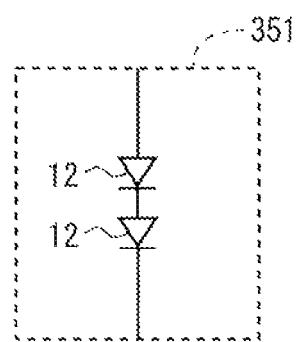
FIG. 20 is a diagram describing a configuration of an LED unit regarding the second embodiment.
Figure 21:
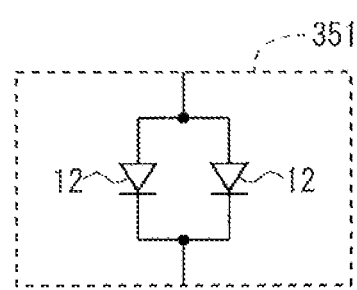
FIG. 21 is a diagram describing a configuration of an LED unit regarding the second embodiment.
Figure 22:
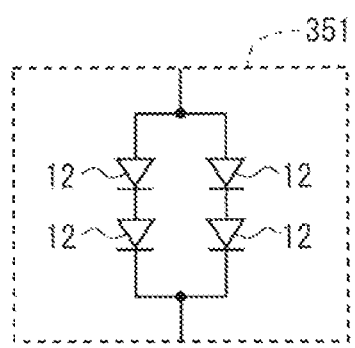
FIG. 22 is a diagram describing a configuration of an LED unit regarding the second embodiment.

It is described in the present embodiment that one LED 12 is provided per area, but the disclosure is not limited thereto. In a case where an LED or LEDs corresponding to one area are defined as an LED unit (a reference sign 351 is assigned to an LED unit), an LED unit 351 may be formed of one LED 12 as illustrated in FIG. 19, the LED unit 351 may be formed of the plurality of LEDs 12 connected in series as illustrated in FIG. 20, the LED unit 351 may be formed of the plurality of LEDs 12 connected in parallel as illustrated in FIG. 21, and the LEDs 12 connected in series and the LEDs 12 connected in parallel may be present being mixed in the LED unit 351 as illustrated in FIG. 22. This applies to a third embodiment as well.

2.3 Configuration for Adjusting Voltage Value of Drive Voltage

Figure 23:
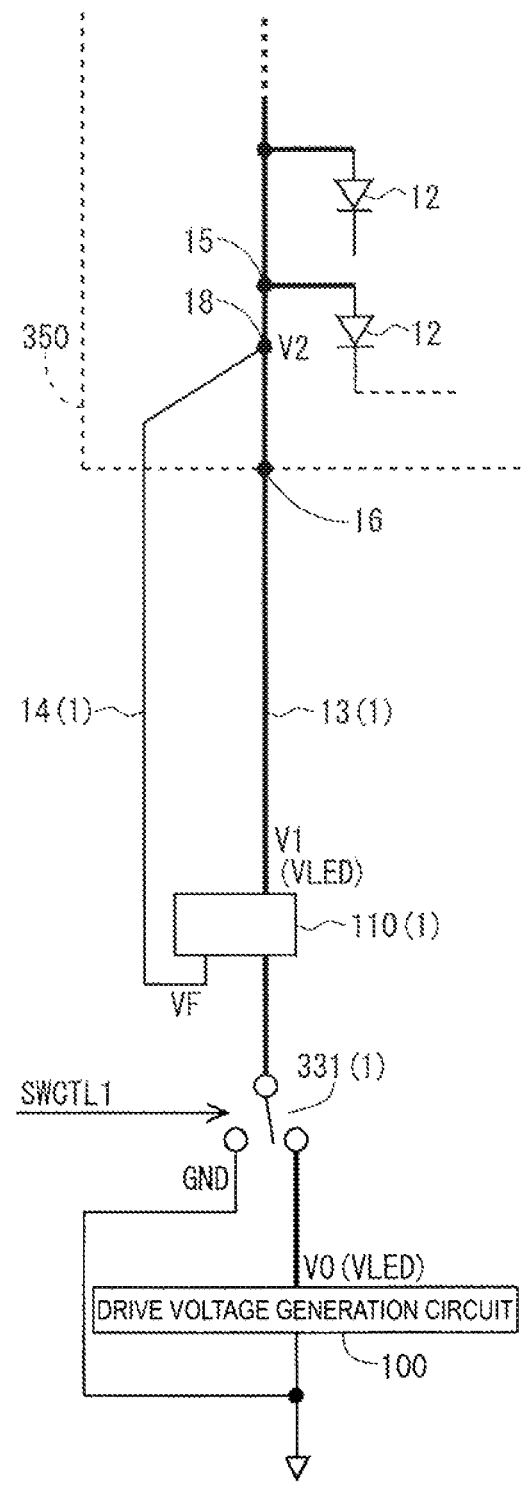
FIG. 23 is a diagram describing a configuration for adjusting a voltage value of a drive voltage in the second embodiment.
Figure 24:
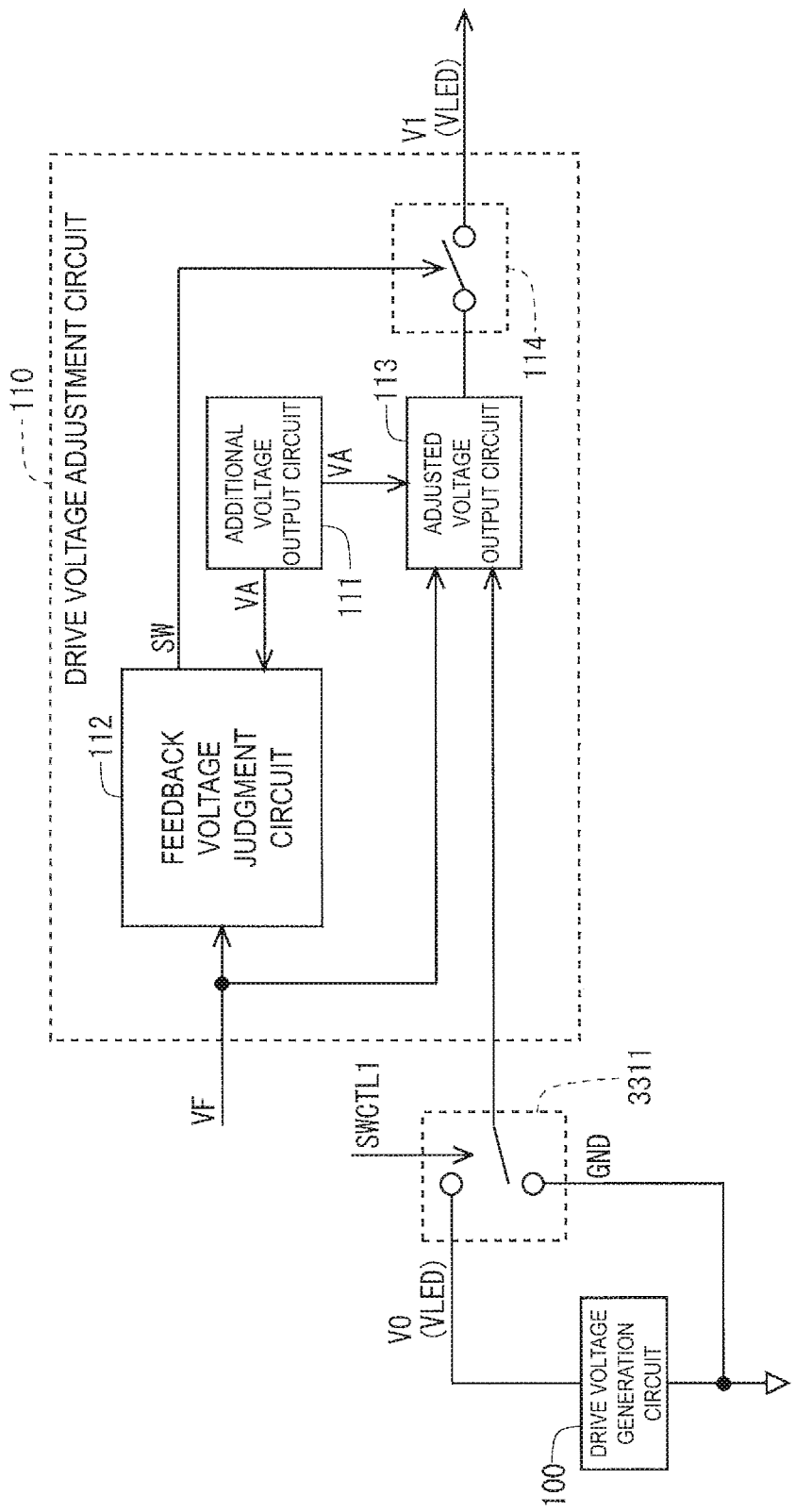
FIG. 24 is a diagram describing a configuration for adjusting a voltage value of a drive voltage in the second embodiment.

A configuration for adjusting the voltage value of the drive voltage VLED will be described with reference to FIGS. 23 and 24. FIGS. 23 and 24 illustrate constituent elements corresponding to the LEDs 12 of the first row (see FIG. 16).

In the present embodiment, as illustrated in FIG. 23, the feedback wiring line 14 is provided to connect a node 18 provided between the drive voltage input node 16 and the main branch node 15, and the drive voltage adjustment circuit 110. In the period P1 illustrated in FIG. 18, the drive voltage adjustment circuit 110 corresponding to the drive voltage wiring line 13(1) is connected to the drive voltage generation circuit 100, and the drive voltage adjustment circuit 110 corresponding to the drive voltage wiring line 13(1) is connected to the ground in the periods P2 to P4 illustrated in FIG. 18.

During the period when the drive voltage adjustment circuit 110 corresponding to the drive voltage wiring line 13(1) is connected to the drive voltage generation circuit 100, the reference point voltage V2, which is the voltage of the node 18, is fed back to the drive voltage adjustment circuit 110 as the feedback voltage VF, and the voltage value of the drive voltage VLED is adjusted as described above in the drive voltage adjustment circuit 110. With this, during the action of the liquid crystal display device, the reference point voltage V2 is maintained substantially equal to the drive source voltage V0.

2.4 Effects

According to the present embodiment, the drive voltage adjustment circuit 110 and the feedback wiring line 14 similar to those of the first embodiment are provided for each block in the backlight 33, in which the passive driving is employed. Thus, regardless of the lighting states of the LEDs 12 in each block, the voltage of the voltage detection target node (the node 18 in FIG. 23) corresponding to each block on the LED substrate 11 is maintained approximately equal to the drive source voltage V0. With this, regardless of the lighting states of the LEDs 12 in each block, the LEDs 12 supplied with the current that is controlled so as to bring the lighting of the same luminance, light at the same luminance.

Figure 25:
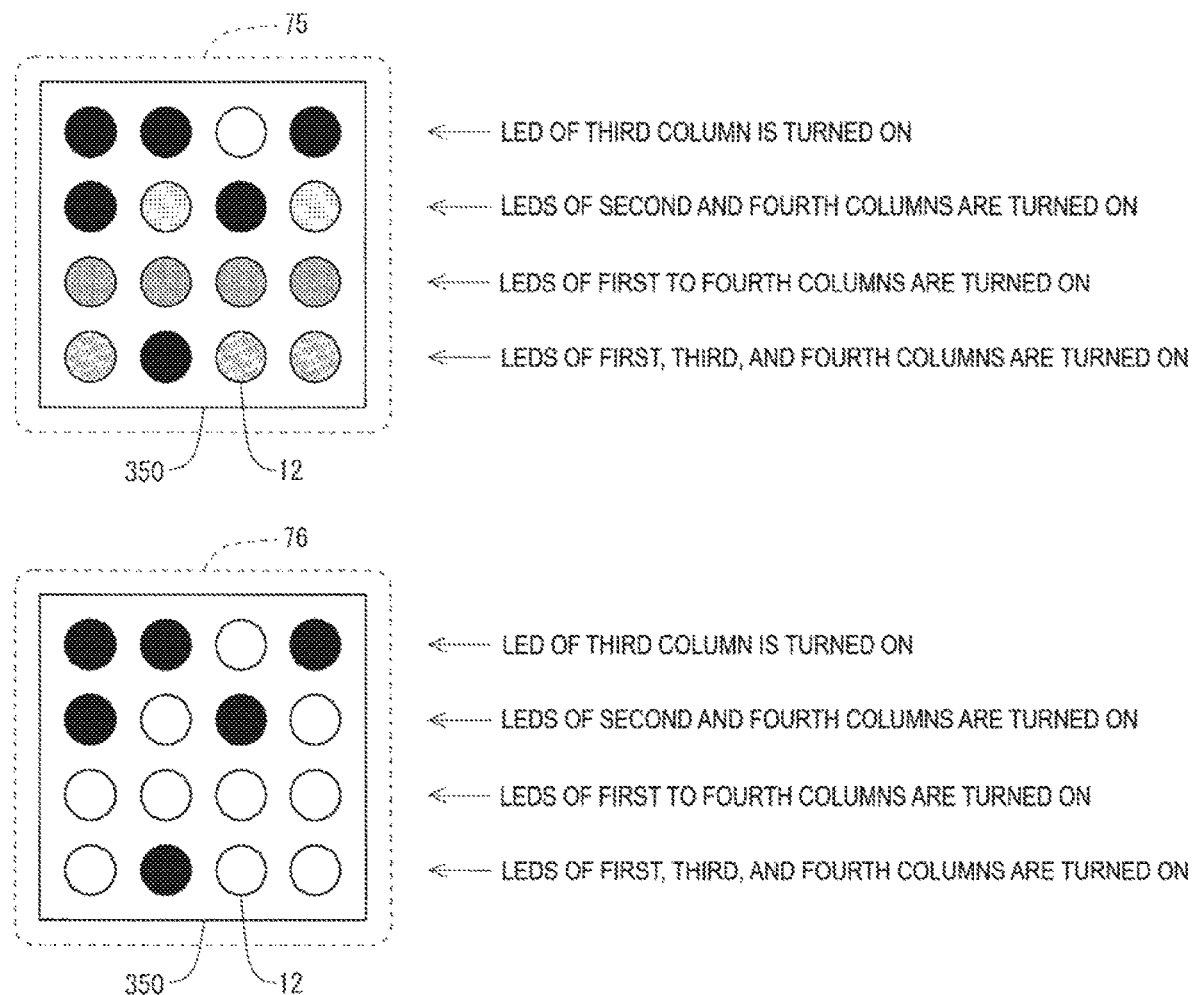
FIG. 25 is a diagram describing an effect of the second embodiment.

A difference between the display state of the related art and the display state obtained in the present embodiment will be described with reference to FIG. 25. In the related art, in a case where the goal lighting luminance takes a certain specific luminance and the number of LEDs 12 to be the lighting targets differs every row, a lighting state as depicted in a portion denoted by a reference sign 75 in FIG. 25 is obtained. All the lighting target LEDs 12 have to light at the same luminance, but in the block having a larger number of lighting target LEDs 12, the luminance of the LEDs 12 therein is lower. In contrast, in the present embodiment, in the same case, a lighting state as depicted in a portion denoted by a reference sign 76 in FIG. 25 is obtained. Regardless of the number of lighting target LEDs 12 in each block, all the lighting target LEDs 12 light at the same luminance.

As described above, according to the present embodiment, in the backlight 33, in which the passive driving is employed, it is possible to suppress the change in lighting luminance caused by the voltage drop of the drive voltage VLED of the LEDs 12.

3. Third Embodiment

3.1 Overall Configuration

Figure 26:
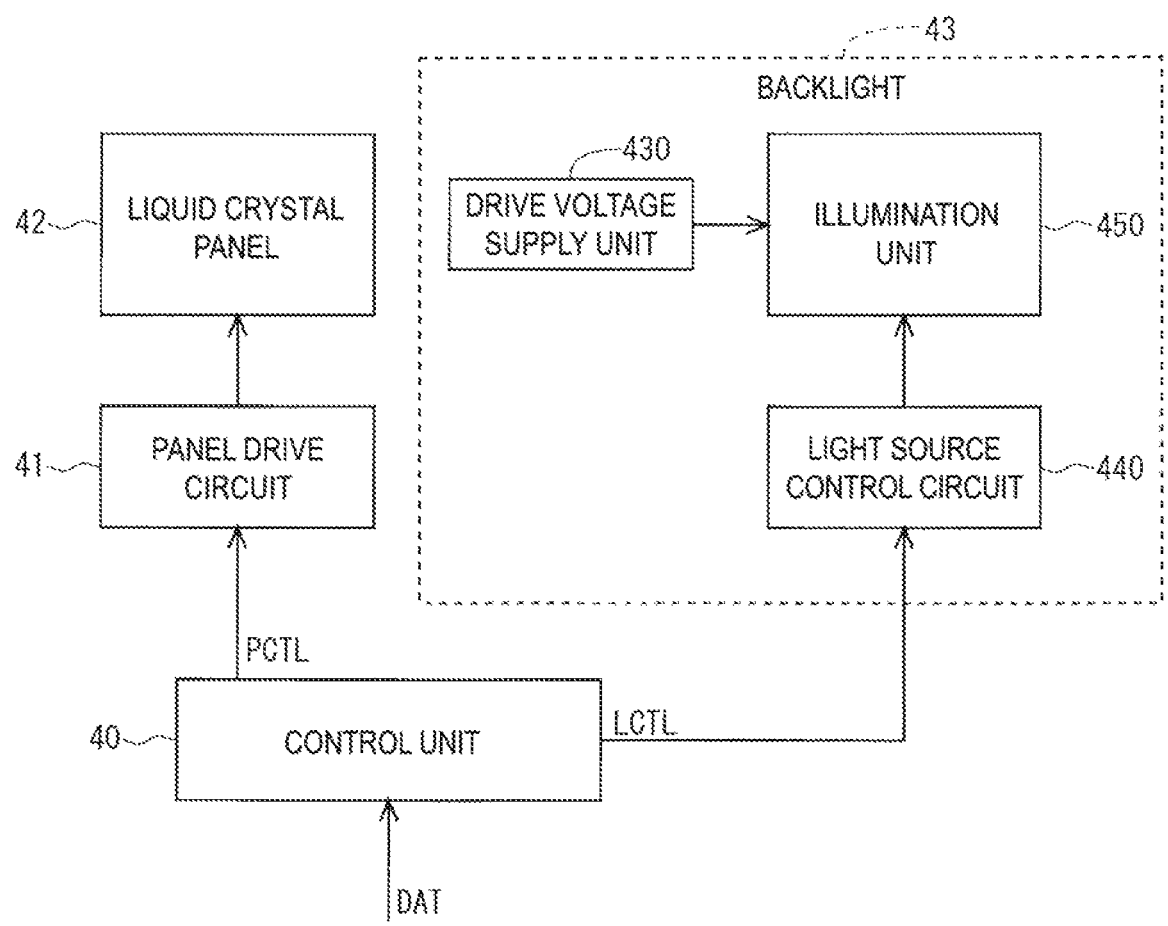
FIG. 26 is a block diagram illustrating an overall configuration of a liquid crystal display device according to a third embodiment.

FIG. 26 is a block diagram illustrating an overall configuration of a liquid crystal display device according to a third embodiment. The liquid crystal display device is constituted by a control unit 40, a panel drive circuit 41, a liquid crystal panel 42, and a backlight (light-emitting device) 43. The backlight 43 includes a drive voltage supply unit 430, a light source control circuit (LED driver) 440, and an illumination unit 450. The illumination unit 450 includes a plurality of LEDs 12. The panel drive circuit 41 and the liquid crystal panel 42 in the present embodiment have the same configurations as those of the panel drive circuit 31 and the liquid crystal panel 32 of the second embodiment, respectively. The control unit 40 of the present embodiment is the same as the control unit 30 of the second embodiment except that the switch control signal SWCTL is not output. Unlike the second embodiment described above, active matrix driving of the LEDs 12 is performed in the backlight 43 of the present embodiment.

3.2 Backlight

Figure 27:
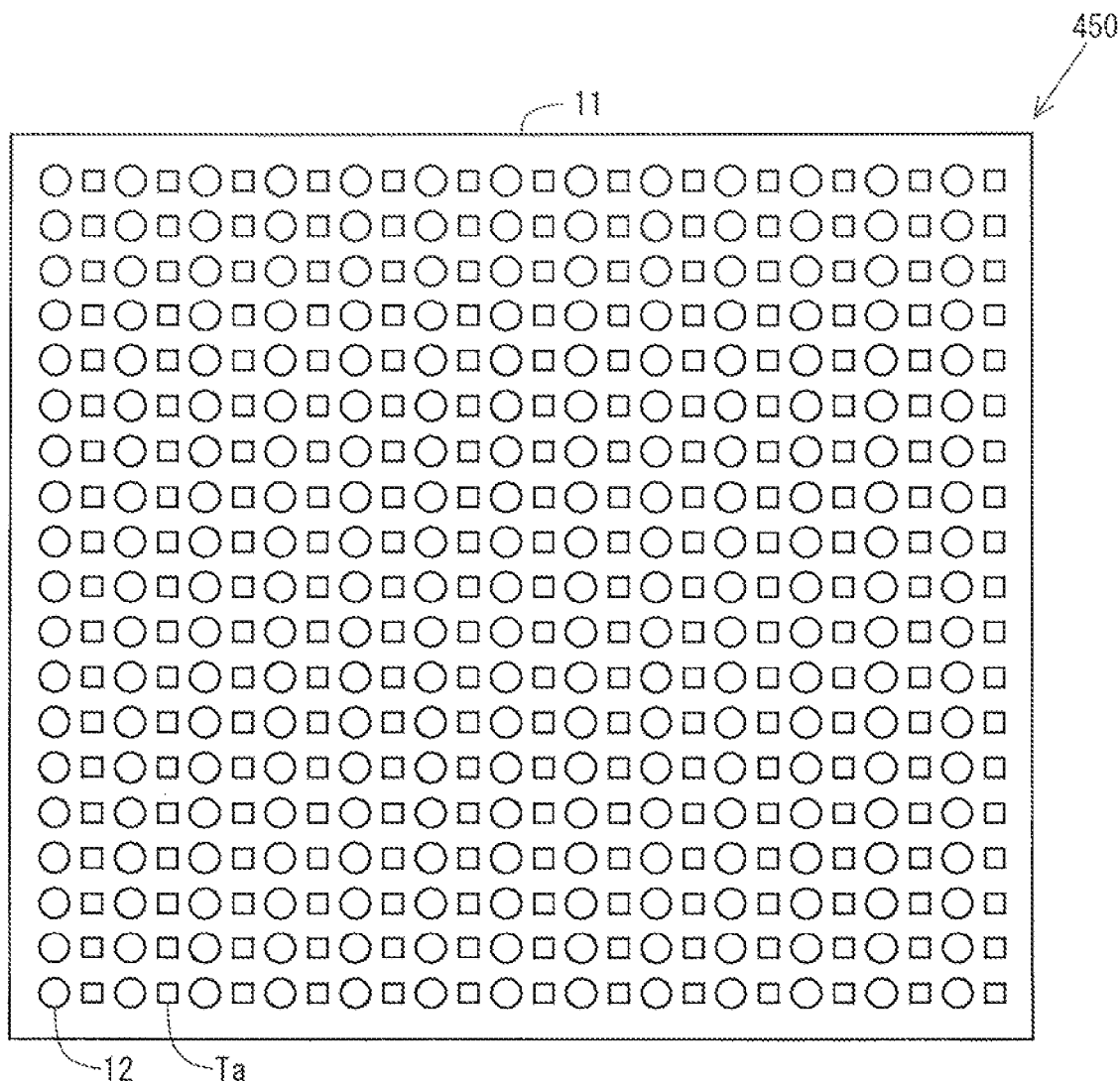
FIG. 27 is a schematic plan view of an illumination unit of the third embodiment.

FIG. 27 is a schematic plan view of the illumination unit 450. As illustrated in FIG. 27, a large number of LEDs 12 and a large number of drive transistors Ta are provided in a matrix shape on the LED substrate 11 constituting the illumination unit 450. In this configuration, the LED 12 and the drive transistor Ta are provided for each area. Each drive transistor Ta controls a current flowing in the corresponding LED 12. The LED 12 of the present embodiment is typically an LED of a significantly small size compared to existing LEDs, such as an LED called "mini LED", an LED called "micro LED", or the like.

Figure 28:
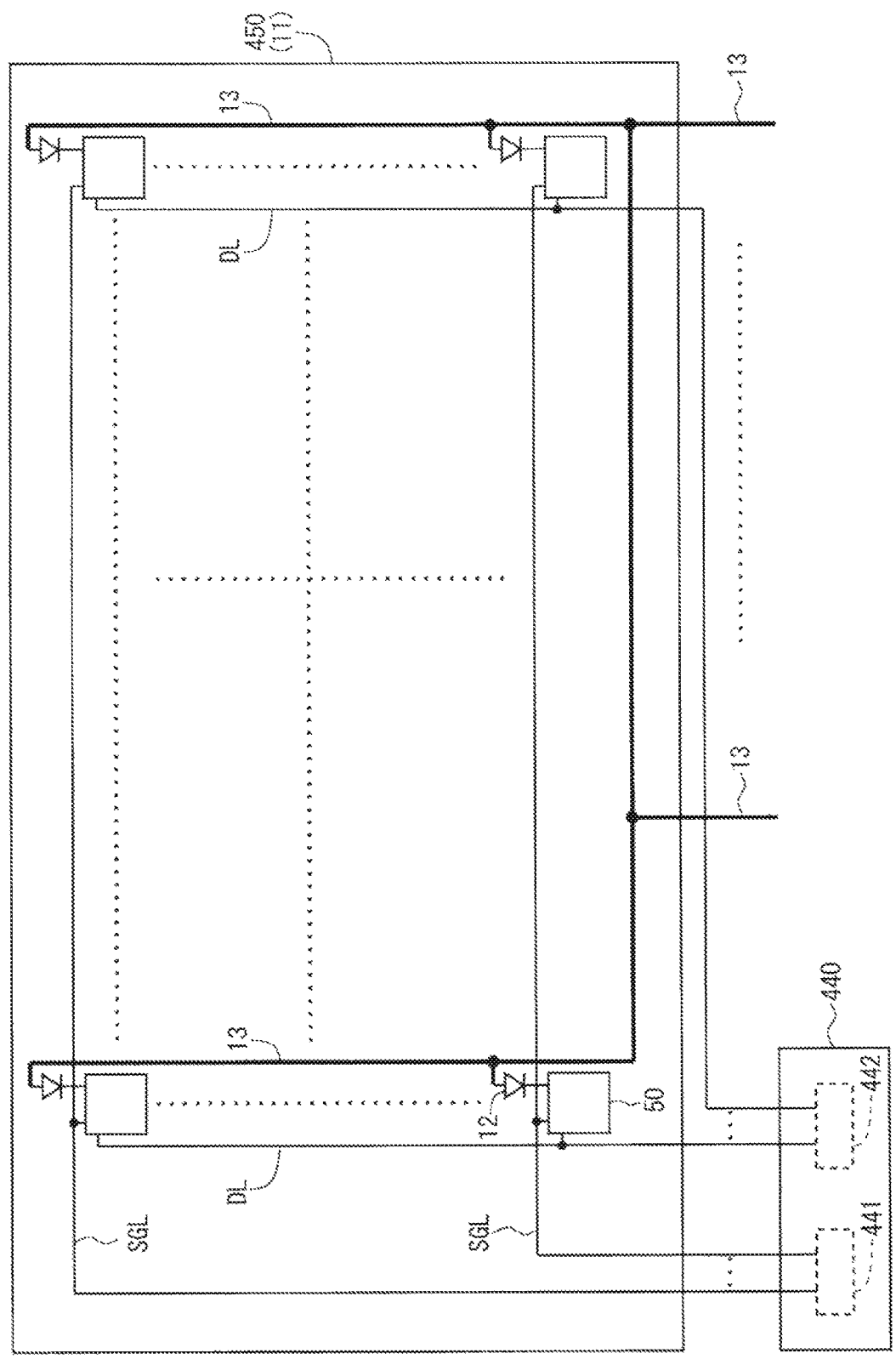
FIG. 28 is a block diagram describing a schematic configuration of an illumination unit and a light source control circuit within a backlight in the third embodiment.

FIG. 28 is a block diagram describing a schematic configuration of the illumination unit 450 and the light source control circuit 440 within the backlight 43. In the present embodiment, the LED substrate 11 constituting the illumination unit 450 is logically divided into a plurality of areas in a matrix shape. The illumination unit 450 is provided with the LEDs 12 and area drive circuits 50 configured to drive the LEDs 12. The LEDs 12 and the area drive circuits 50 are each provided in the number equal to the number of areas. As illustrated in FIG. 28, write control lines SGL provided one by one for each row and data lines DL provided one by one for each column are arranged on the LED substrate 11 constituting the illumination unit 450. The write control line SGL transmits a write control signal output from the light source control circuit 440, and the data line DL transmits a data voltage output from the light source control circuit 440. Further, as illustrated in FIG. 28, the drive voltage wiring lines 13 provided one by one for each column are disposed on the LED substrate 11 constituting the illumination unit 450.

The light source control circuit 440 includes a shift register 441 configured to drive the write control lines SGL, and a data line drive circuit 442 configured to drive the data lines DL. The shift register 441 and the data line drive circuit 442 control the actions of a plurality of the area drive circuits 50 so that the LEDs 12 mounted on the LED substrate 11 are driven row by row. In the present embodiment, a drive control circuit configured to control the actions of the plurality of area drive circuits 50 is implemented by the light source control circuit 440.

Figure 29:
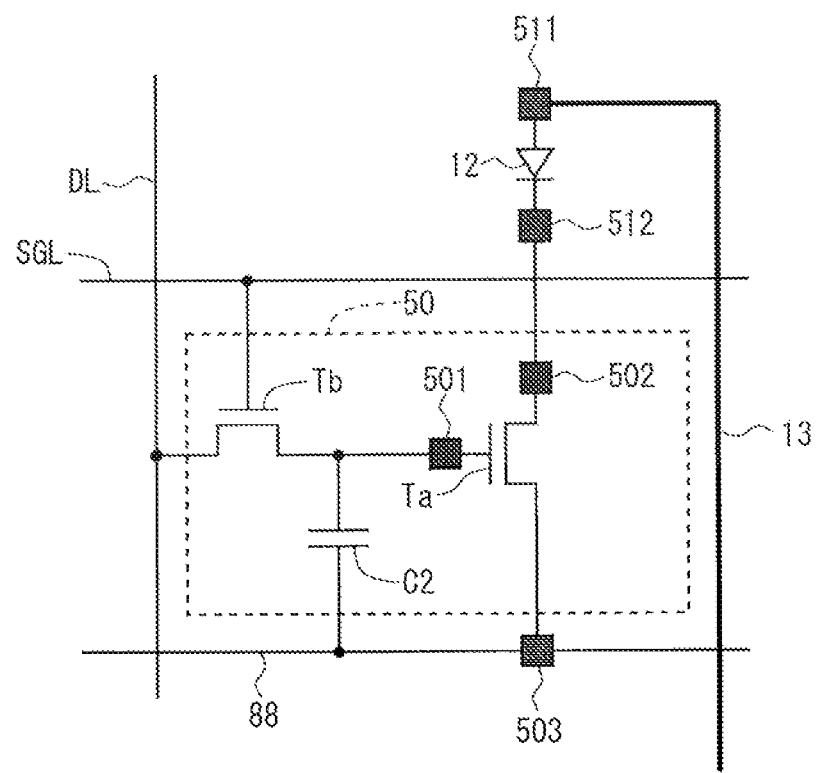
FIG. 29 is a circuit diagram illustrating a configuration of an area drive circuit of the third embodiment.

FIG. 29 is a circuit diagram illustrating a configuration of the area drive circuit 50. As illustrated in FIG. 29, the area drive circuit 50 is constituted by the drive transistor Ta, a writing control transistor Tb, and a holding capacitor C2. The drive transistor Ta is a metal oxide semiconductor field effect transistor (MOSFET), and the writing control transistor Tb is a TFT. In the present embodiment, both drive transistor Ta and writing control transistor Tb are of an n-channel type. Incidentally, for an n-channel type transistor, one terminal having a higher potential out of a drain and a source is generally referred to as the drain, but in the following description, one of the terminals is defined as a drain and the other is defined as a source, and thus, a source potential may be higher than a drain potential in some cases.

As illustrated in FIG. 29, the LED 12 and the drive transistor Ta are connected in series between the drive voltage wiring line 13 as a third wiring line and a ground wiring line 88. The drive transistor Ta has a gate terminal connected to a drain terminal of the writing control transistor Tb and one end of the holding capacitor C2, has the drain terminal connected to a cathode terminal of the LED 12, and has a source terminal connected to the ground wiring line 88. The writing control transistor Tb has a gate terminal connected to the write control line SGL, has a source terminal connected to the data line DL, and has a drain terminal connected to the one end of the holding capacitor C2 and the gate terminal of the drive transistor Ta. The holding capacitor C2 has the one end connected to the drain terminal of the writing control transistor Tb and the gate terminal of the drive transistor Ta, and has the other end connected to the ground wiring line 88. Various compensation circuits may be provided inside the area drive circuit 50.

Of the constituent elements illustrated in FIG. 29, the LED 12 and the drive transistor Ta are provided in the form of being attached on the LED substrate 11. That is, an anode terminal and the cathode terminal of the LED 12 are respectively connected to pads 511 and 512 formed on the LED substrate 11; the gate terminal, drain terminal, and source terminal of the drive transistor Ta are respectively connected to pads 501, 502, and 503 formed on the LED substrate 11. When the amount of current per area is small, a TFT formed on the LED substrate 11 being a glass substrate may be employed as the drive transistor Ta, in place of the MOSFET in the form of being attached.

In the configuration described above, the write control signal that rises to a high level in sequence for a predetermined period is applied to the plurality of write control lines SGL disposed on the LED substrate 11. When the write control signal applied to a certain write control line SGL rises to the high level, the data voltage is written to the holding capacitor C2 via the writing control transistor Tb in the area drive circuit 50 corresponding to the write control line SGL. In other words, charge corresponding to the data voltage is accumulated in the holding capacitor C2. Thereafter, by the write control signal falling down to the low level, the data voltage having been written to the holding capacitor C2 is maintained. Thus, throughout a period until the write control signal changes to the high level next time, a current of magnitude corresponding to the held data voltage flows through the drive transistor Ta, and the LED 12 emits light at the luminance corresponding to the magnitude of the current. In this manner, the luminance of the LED 12 of each area is controlled. In this case, the write control signal applied to each write control lines SGL rises to the high level only once in one frame period, and thus the luminance of the LED 12 of each area is controlled for each frame period.

3.3 Configuration for Adjusting Voltage Value of Drive Voltage

Figure 30:
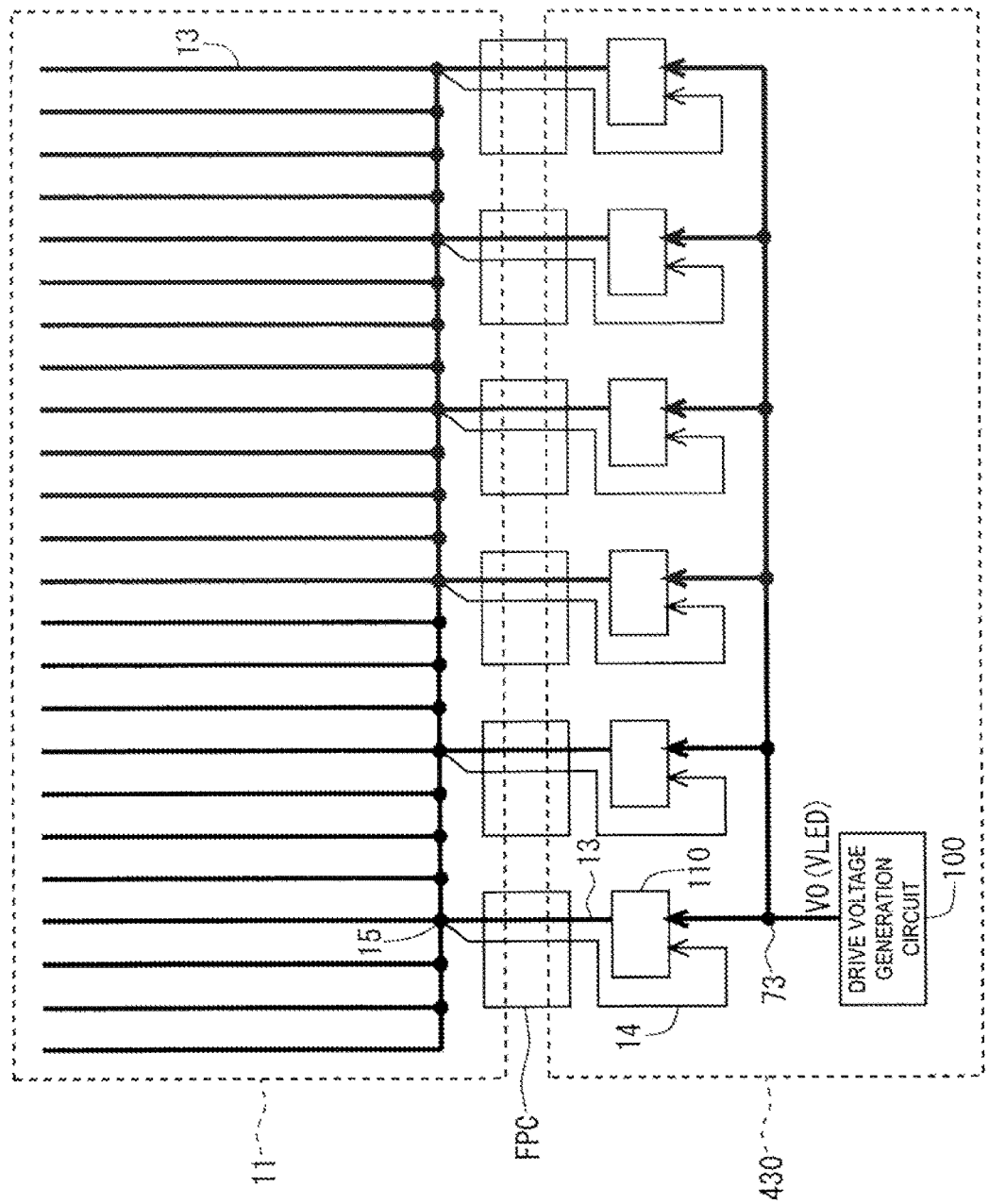
FIG. 30 is a diagram describing a configuration for adjusting a voltage value of a drive voltage in the third embodiment.

A configuration for adjusting the voltage value of the drive voltage VLED will be described with reference to FIGS. 30 and 31. In the present embodiment, as illustrated in FIG. 30, the drive voltage VLED is supplied from a plurality of points to the LED substrate 11 constituting the illumination unit 450. To achieve this configuration, the drive voltage wiring line 13 extending from the drive voltage generation circuit 100 to the LED substrate 11 is branched at a portion denoted by a reference sign 73 in FIG. 30. In other words, the drive voltage VLED output from the drive voltage generation circuit 100 is supplied to the LED substrate 11 through a plurality of connection paths (drive voltage supply paths). As illustrated in FIG. 30, the drive voltage supply unit 430 is provided with the drive voltage adjustment circuits 110 and the feedback wiring lines 14 in such a manner as to correspond to each of the plurality of connection paths. In the present embodiment, the drive voltage supply unit 430 is provided on a control board, and the control board and the LED substrate 11 are connected to each other via a flexible printed circuit board (FPC).

Figure 31:
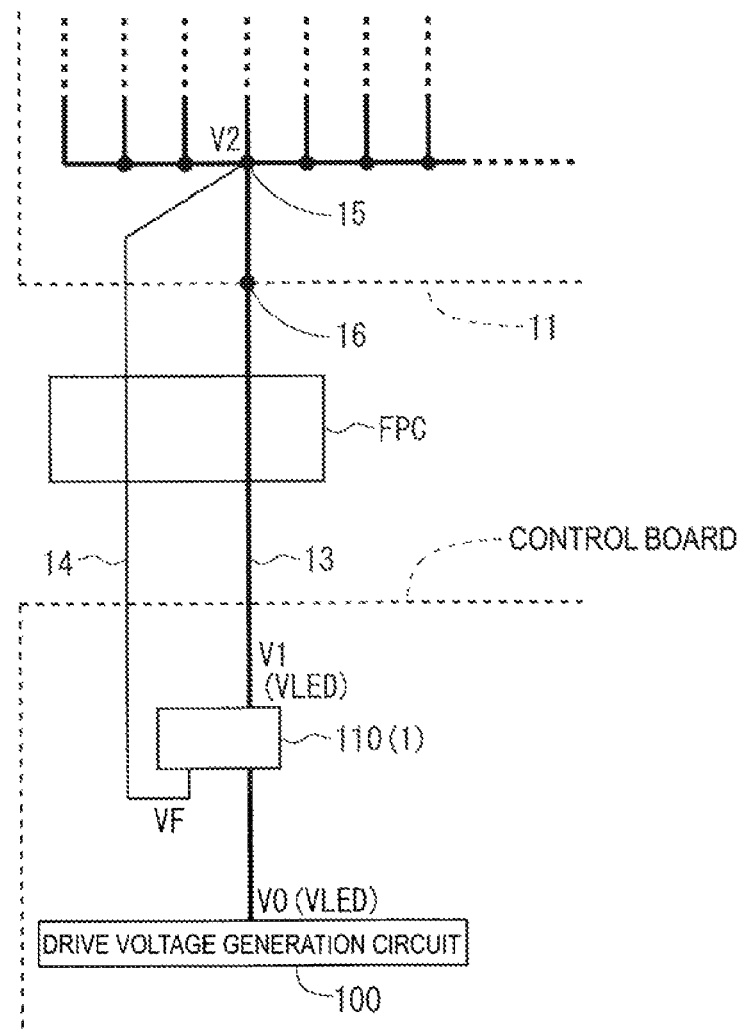
FIG. 31 is a diagram describing a configuration for adjusting a voltage value of a drive voltage in the third embodiment.

FIG. 31 illustrates constituent elements corresponding to one connection path. As is understood from FIG. 31, in each connection path, the main branch node 15 is considered as the voltage detection target node. The feedback wiring line 14 is disposed between the main branch node 15 and the drive voltage adjustment circuit 110 in such a manner that the reference point voltage V2 is fed back to the drive voltage adjustment circuit 110.

By the configuration as described above, with respect to each of the plurality of connection paths, the reference point voltage V2, which is a voltage of the main branch node 15, is fed back to the drive voltage adjustment circuit 110 as the feedback voltage VF, and the voltage value of the drive voltage VLED is adjusted as described above in the drive voltage adjustment circuit 110. As a result, during the action of the liquid crystal display device, the voltage of the main branch node 15 (the reference point voltage V2) corresponding to each of the plurality of connection paths is maintained substantially equal to the drive source voltage V0.

3.4 Effects

According to the present embodiment, in the backlight 43, in which the active matrix driving of the LEDs 12 is employed, the drive voltage VLED generated by the drive voltage generation circuit 100 is supplied to the LED substrate 11 through the plurality of connection paths. In this case, the drive voltage adjustment circuit 110 and the feedback wiring line 14 similar to those of the first embodiment are provided for each connection path. Thus, regardless of the lighting states of the LEDs 12 in the entire illumination unit 450, the voltage (the reference point voltage V2) of the voltage detection target node (the main branch node 15 in the present embodiment) corresponding to each connection path on the LED substrate 11 is maintained substantially equal to the drive source voltage V0. With this, regardless of the lighting states of the LEDs 12 in the entire illumination unit 450, the LEDs 12 whose corresponding holding capacitors C2 have been written with the voltage to bring the lighting of the same luminance, light at the same luminance. As described above, according to the present embodiment, in the backlight 43, in which the active matrix driving of the LEDs 12 is employed, the change in lighting luminance caused by the voltage drop of the drive voltage VLED of the LEDs 12 may be suppressed.

4. Other

Although the present disclosure has been described in detail above, the above description is exemplary in all respects and is not limited thereto. It is understood that numerous other modifications or variations can be made without departing from the scope of the present disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A light-emitting device in which a light emitting diode (LED) serves as a light source, the light-emitting device comprising:
   an LED substrate on which a plurality of LEDs are mounted;
   a drive voltage generation circuit configured to generate a drive voltage for driving the plurality of LEDs;
   a drive voltage adjustment circuit configured to adjust a voltage value of the drive voltage;
   a drive voltage wiring line including a first wiring line disposed between the drive voltage generation circuit and the drive voltage adjustment circuit, a second wiring line disposed between the drive voltage adjustment circuit and the LED substrate, and a third wiring line disposed on the LED substrate, the drive voltage wiring line being configured to supply the drive voltage to the plurality of LEDs; and
   a feedback wiring line for supplying the drive voltage adjustment circuit with a voltage of a voltage detection target node provided on the third wiring line,
   wherein the third wiring line, which has a drive voltage input node being a connection point with the second wiring line as a start point, branches at one or more branch points on the LED substrate,
   the feedback wiring line is disposed between the voltage detection target node and the drive voltage adjustment circuit, where a main branch node which is a branch point closest to the drive voltage input node among the one or more branch points is taken as the voltage detection target node, or one point between the drive voltage input node and the main branch node is taken as the voltage detection target node, and
   the drive voltage adjustment circuit outputs a voltage higher than a voltage supplied by the first wiring line to the second wiring line as the drive voltage in accordance with a difference between the voltage supplied by the first wiring line and a voltage supplied by the feedback wiring line.

2. The light-emitting device according to claim 1,
wherein the drive voltage adjustment circuit includes a drive voltage output control circuit configured to stop output of the drive voltage to the second wiring line in a case where the voltage of the voltage detection target node is not successfully transmitted by the feedback wiring line.

3. The light-emitting device according to claim 2,
wherein the drive voltage adjustment circuit further includes an adjusted voltage output circuit configured to generate an adjusted voltage that is output as the drive voltage to the second wiring line based on the voltage supplied by the first wiring line and the voltage supplied by the feedback wiring line, and output the adjusted voltage to the second wiring line as the drive voltage,
the drive voltage output control circuit includes
a feedback voltage judgment circuit configured to judge whether the voltage of the voltage detection target node is successfully transmitted by the feedback wiring line by comparing the voltage supplied by the feedback wiring line with a predetermined set voltage, and
a drive voltage output control switch provided between the adjusted voltage output circuit and the second wiring line, and
in a case where the feedback wiring line judges that the voltage of the voltage detection target node is not successfully transmitted, the feedback voltage judgment circuit supplies a control signal to the drive voltage output control switch in such a manner as to cause the drive voltage output control switch to be in an off state.

4. The light-emitting device according to claim 3,
wherein the drive voltage adjustment circuit further includes an additional voltage output circuit configured to output, during regular operation, an additional voltage corresponding to a sum of a maximum dropped voltage of the drive voltage expected to be generated in a route from the adjusted voltage output circuit to the voltage detection target node and the drive voltage to be supplied to the plurality of LEDs, and
in a case where the voltage supplied by the feedback wiring line is equal to or lower than the set voltage and the additional voltage is equal to or higher than a drive voltage to be supplied to the plurality of LEDs, the feedback voltage judgment circuit supplies the control signal to the drive voltage output control switch in such a manner as to cause the drive voltage output control switch to be in an off state.

5. The light-emitting device according to claim 4,
wherein the adjusted voltage output circuit includes an operational amplifier having an inverting input terminal connected to the feedback wiring line, a non-inverting input terminal connected to the first wiring line, and an output terminal connected to the second wiring line.

6. The light-emitting device according to claim 5,
wherein the additional voltage is supplied as a positive side power supply voltage to the operational amplifier.

7. The light-emitting device according to claim 3,
wherein the feedback voltage judgment circuit includes a resistor with one end connected to the feedback wiring line and another end grounded, and
a resistance value of the resistor is equal to or 1000 times larger than a value of wiring line resistance of the feedback wiring line.

8. A display device, comprising:
a display panel including a display portion configured to display an image; and
the light-emitting device according to claim 1 provided on a back face of the display panel in such a manner that the display portion is irradiated with light.

9. The display device according to claim 8,
wherein the light-emitting device includes
a plurality of LED units, each being constituted of one or more LEDs, provided on the LED substrate being logically divided into a plurality of areas, corresponding to the plurality of areas one-to-one,
a plurality of area drive circuits provided corresponding to the plurality of LED units one-to-one, each being configured to drive the LED included in a corresponding LED unit,
a plurality of write control lines,
a plurality of data lines intersecting with the plurality of write control lines,
a ground wiring line, and a drive control circuit connected to the plurality of write control lines and the plurality of data lines, and configured to control action of the plurality of area drive circuits in such a manner that the LEDs included in the plurality of LED units are driven row by row, and each area drive circuit includes, a drive transistor connected in series to the LED included in a corresponding one of the LED units between the third wiring line and the ground wiring line, a writing control transistor having a control terminal connected to a corresponding one of the write control lines and a first conduction terminal connected to a corresponding one of the data lines, and a holding capacitor having one end connected to a second conduction terminal of the writing control transistor and a control terminal of the drive transistor and another end connected to the ground wiring line.

10. The display device according to claim 8, wherein the drive voltage is supplied from the drive voltage generation circuit to the LED substrate via a plurality of drive voltage supply paths as the drive voltage wiring line, and the drive voltage adjustment circuit and the feedback wiring line are provided corresponding to each of the plurality of drive voltage supply paths.

11. The display device according to claim 8, wherein the light-emitting device includes a plurality of LED units, each being constituted of one or more LEDs, that are divided into a plurality of blocks, a switching circuit configured to switch a supply destination of a drive voltage generated by the drive voltage generation circuit among the plurality of blocks in such a manner that the LEDs included in the plurality of LED units are driven for each block, and a light source control circuit including lighting control switches of a number equal to the number of LED units included in each block, each lighting control switch being configured to control whether to supply a current to the LED constituting the corresponding LED unit, and the third wiring line, the drive voltage adjustment circuit, and the feedback wiring line are provided corresponding to each of the plurality of blocks.

12. An LED display device, comprising:

the light-emitting device according to claim 1; and a luminance control circuit configured to control luminance of the plurality of LEDs.

13. The LED display device according to claim 12, wherein the plurality of LEDs are organic light-emitting diodes.

14. The light-emitting device according to claim 1, wherein the drive voltage adjustment circuit includes an operational amplifier having an inverting input terminal connected to the feedback wiring line, a non-inverting input terminal connected to the first wiring line, and an output terminal connected to the second wiring line.

* * * * *